US011107152B2

(12) United States Patent
Wadhawan et al.

(10) Patent No.: US 11,107,152 B2
(45) Date of Patent: Aug. 31, 2021

(54) WEIGHT-BASED SHIPPING SYSTEM

(71) Applicant: Amazon Technologies, Inc., Seattle, WA (US)

(72) Inventors: Priyanka Wadhawan, Seattle, WA (US); Yvonne Chou, Seattle, WA (US); Douglas James Herrington, Seattle, WA (US); Stephenie Landry, Seattle, WA (US); Na Li, Bellevue, WA (US); Lisa Marie Maya, Shoreline, WA (US); Subramanian Sundaresan, Seattle, WA (US); Hao Yu, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 16/383,434

(22) Filed: Apr. 12, 2019

(65) Prior Publication Data
US 2019/0236690 A1 Aug. 1, 2019

Related U.S. Application Data

(63) Continuation of application No. 14/289,480, filed on May 28, 2014, now Pat. No. 10,290,046.

(60) Provisional application No. 61/949,779, filed on Mar. 7, 2014.

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0603* (2013.01); *G06Q 30/0633* (2013.01)

(58) Field of Classification Search
CPC ............... G06Q 30/00; G06Q 30/0601; G06Q 30/0603; G06Q 30/0633; G06Q 30/0641
See application file for complete search history.

(56) References Cited

U.S. PATENT DOCUMENTS

| 6,148,291 | A | 11/2000 | Radican | |
| 6,219,653 | B1* | 4/2001 | O'Neill | G06Q 10/08 705/29 |
| 2006/0111929 | A1 | 5/2006 | Poole et al. | |
| 2009/0048987 | A1* | 2/2009 | Sweeney | G06Q 30/0283 705/400 |

(Continued)

OTHER PUBLICATIONS

Lavender, Steven A., Pei-Ling Ko, and Carolyn M. Sommerich. "Biomechanical evaluation of the Eco-Pick lift assist: A device designed to facilitate product selection tasks in distribution centers." Applied ergonomics 44.2 (2013): 230-236. (Year: 2013).*

(Continued)

*Primary Examiner* — Christopher B Seibert
(74) *Attorney, Agent, or Firm* — Knobbe, Martens, Olson & Bear LLP

(57) ABSTRACT

Embodiments of systems and methods described herein provide users with access to a weight-based shipping service that enables the users to purchase a group of items and pay a flat shipping fee. These systems and methods can enable a user to combine certain items into a box or set of boxes based on weight for a reduced shipping cost. In addition, systems and methods described herein can recommend items to users for purchase based at least in part on the items that a user has added to a box, including based on remaining weight in the box.

20 Claims, 18 Drawing Sheets

(56) References Cited

U.S. PATENT DOCUMENTS

| | | | |
|---|---|---|---|
| 2009/0089159 A1* | 4/2009 | Ren | G06Q 10/08 |
| | | | 705/14.17 |
| 2010/0318437 A1* | 12/2010 | Yee | G06Q 10/087 |
| | | | 705/26.1 |
| 2011/0302030 A1* | 12/2011 | Lore | G06Q 30/0251 |
| | | | 705/14.49 |
| 2012/0158385 A1* | 6/2012 | Arunapuram | G06Q 10/083 |
| | | | 703/6 |
| 2012/0259687 A1 | 10/2012 | Kajamohideen et al. | |
| 2012/0323638 A1* | 12/2012 | Knipfer | G06Q 10/083 |
| | | | 705/7.37 |
| 2013/0173417 A1* | 7/2013 | Spremulli | G06Q 30/06 |
| | | | 705/26.7 |
| 2013/0173487 A1 | 7/2013 | May | |
| 2013/0218799 A1 | 8/2013 | Lehmann et al. | |
| 2013/0297522 A1* | 11/2013 | Prochazka | G06Q 30/06 |
| | | | 705/330 |
| 2014/0172736 A1 | 6/2014 | Saha | |
| 2014/0279659 A1* | 9/2014 | Seay | G06Q 10/083 |
| | | | 705/337 |
| 2015/0006428 A1* | 1/2015 | Miller | G06Q 10/0835 |
| | | | 705/336 |
| 2015/0161556 A1* | 6/2015 | Jena | G06Q 10/083 |
| | | | 705/14.23 |

OTHER PUBLICATIONS

Dereli, Türkay, and Gulesin Sena Das. "Development of a decision support system for solving container loading problems." Transport 25.2 (2010): 138-147.(Year: 2010).

International Search Report dated Sep. 2, 2015 in corresponding PCT Application No. PCT/US15/18959 in 12 pages.

* cited by examiner

620 — 621

Showing 1 - 16 of 32 Results                    Choose a Department ⊡ to enable sorting

Tide HE Original Scent Liquid Laundry Detergent 2 X 50 Fl Oz (Pack of 2) by tide
$22.61 $15.08 ($0.15/oz)          ☆☆☆☆☆ ⊡ (838)
FREE SHIPPING                          $1.00 coupon available See Details
More Buying Choices                    Product Features
$12.39 open box (1 offer)              Original Scent
                                       Health & Personal Care: See all 30 items

Tide HE Original Scent Liquid Laundry Detergent, 100 Fl Oz by Tide
$ 11.97 ($0.12/oz)                     ☆☆☆☆☆ ⊡ (838)
                                       Product Features
WEIGHTED-SHIPPING                      Original Scent                    — 622
                                       Fills 16% of your box For each item, we show what % of a weight-based shipping
container it will fill based on its size and weight.

Our weight-based shipping containers are large and can hold — 624
up to 45 pounds or 3 cubic fee: of product.

This item is 7.4 pounds or 16% of a weight-based               30 items
shipping container.

Tide Original Scent Liquid laundry Detergent, 40 Fl Oz by Tide
$20.99                                 Everything Else: See all items.
In Stock. Usually ships within 2 to 3 days.

**Tide Vivid White + Bright He Original Scent Liquid Laundry Detergent 26 loads 50
Fl Oz** by Tide
$22.99 new (1 offer)                   Product Features
                                       Original Scent
                                       Health & Personal Care: See all 30 items

Tide HE Original Scent, 100-Ounce Bottles (Pack of 4) by Tide
$113.19 $42.83 ($0.11/fl oz)       ☆☆☆☆☆ ⊡ (30)
only 7 left in stock - order soon.     Product Features
More Buying Choices                    Original Scent
$42.83 new (12 offers)                 Health & Personal Care: See all 30 items

What is Weighted-Shipping?

✓ Everyday essential in everyday sizes
Access to WEIGHTED SHIPPING is already included with your membership ✓ Let us do the heavy lifting
Fill your box, delivery is $ 5.99 for each box up to 40 pounds
Learn more

7 pounds in your box.
Keep going, you can add 33 more.

Breakfast & Snacks

Household Supplies

Edit your Cart

Customers Who Bought *Tide Original Liquid Laundry... Also Bought*

Downy Ultra Liquid Fabric Softener, Mountain Spring Scent...
☆☆☆☆☆ 17
$30.86 WEIGHTED-SHIPPING
Add to Cart Bounty Select-A-Size Paper Towels, 12 Huge Rolls(Packaging...
☆☆☆☆☆ 299
$38.29 $30.93 WEIGHTED-SHIPPING
Add to Cart Quilting Northern Ultra Plus Tissue, 48...
☆☆☆☆☆ 711
$38.76 $23.94 WEIGHTED-SHIPPING
Add to Cart

FIG. 10

Showing 1 - 12 of 12 Results                                          Sort by Relevan Pepperidge Farm Goldfish, Cheddar,        Pepper Farm Goldfish, Smores,         Pepperidge Farm Baked G
30-ounce carton                           1.5-ounce bags (pack of 24)           Crackers - 58oz
$6.78 ($0.22/oz) WEIGHTED-SHIPPING        $8.99 ($0.24/oz) WEIGHTED-SHIPPING    $8.98 ($0.15oz) WEIGHTED-
In Stock                                  In Stock                              In Stock
Weight: 2 pounds                          Weight: 3 pounds                      Weight: 3.6 pound
☆☆☆☆☆ (372)                               ☆☆☆☆☆ (372)                           ☆☆☆☆☆ (372)
[Add to Cart]                             [Add to Cart]                         [Add to Cart]

Pepperidge Farm Goldfish, Smores,         Pepper Farm Goldfish, made            Pepperidge Farm Goldfish,
30-ounce carton                           with Whole Grain Cheddar,             Cheddar,30-ounce carton
$6.78 ($0.23/oz) WEIGHTED-SHIPPING        30-ounce carton                       $6.78 ($0.22/oz) WEIGHTED-
In Stock                                  $6.80 ($0.23/oz) WEIGHTED-SHIPPING    In Stock

WEIGHT-BASED SHIPPING SYSTEM

CROSS-REFERENCE TO RELATED APPLICATIONS

This application is a continuation of U.S. application Ser. No. 14/289,480, filed May 28, 2014, titled "WEIGHT-BASED SHIPPING SYSTEM," which is a nonprovisional of U.S. Provisional Application No. 61/949,779, filed Mar. 7, 2014, titled "WEIGHT-BASED SHIPPING SYSTEM," all disclosures of which are hereby incorporated by reference in their entirety.

BACKGROUND

Electronic shopping has become widely available, and many consumer items (e.g., products and/or services) are readily available for purchase via network sites, such as retail web sites. Typically, when a consumer buys an item from a network site, the consumer not only pays for the item itself, but also pays for the cost associated with shipping the item to the consumer. Such shipping cost is usually proportional to the weight of the item that is being shipped. To encourage consumers to shop via network sites, many retailers offer free shipping if the consumer makes a purchase that is over a certain dollar value. Alternatively, the retailers may offer a paid membership that may include free shipping as one of its benefits.

BRIEF DESCRIPTION OF THE DRAWINGS

Throughout the drawings, reference numbers are re-used to indicate correspondence between referenced elements. The drawings are provided to illustrate embodiments described herein and not to limit the scope thereof.

FIG. 6B depicts another example graphical user interface that provides access to an electronic catalog.

FIG. 7 depicts an example graphical user interface that provides details of an item in an electronic catalog.

FIG. 8 depicts an example graphical user interface that provides item recommendations.

FIG. 10 depicts an example graphical user interface that provides weights of items in an electronic catalog.

DETAILED DESCRIPTION

I. Introduction

Figure 1:
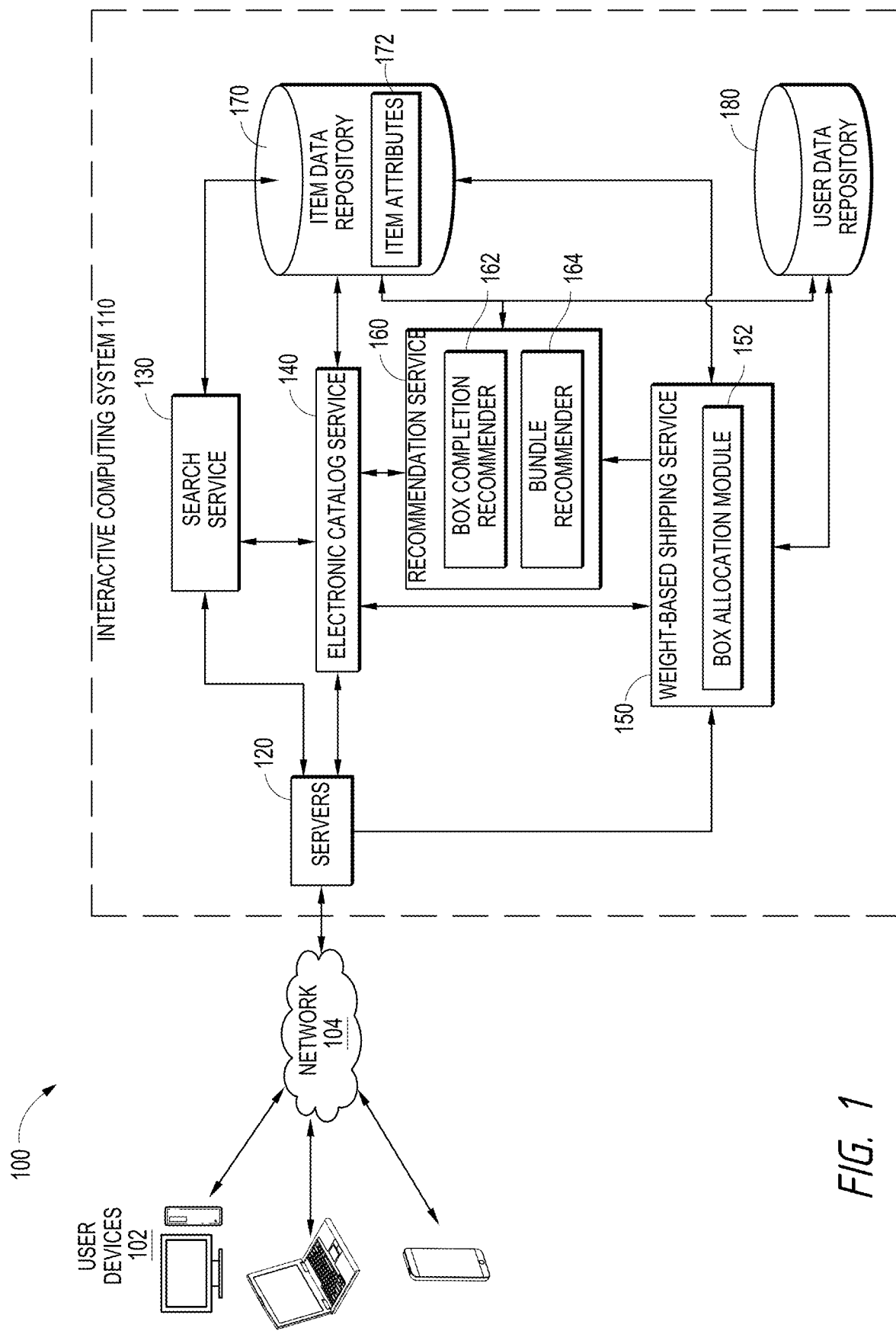
FIG. 1 depicts an embodiment of a computing environment that provides users with access to an interactive computing system capable of providing a weight-based shipping service to a user.

Despite the free shipping services described above, for certain situations, it may be disadvantageous for the electronic retailer to offer those free shipping services. For example, for items that have a low average selling price (ASP) but are heavier than many other items (such as large consumer goods like laundry detergent), by offering free shipping on those items, the electronic retailers may suffer a loss due to high shipping costs. However, shifting the burden of paying those high shipping charges to consumers would discourage them from buying those items. If such items can be combined with other items that have higher selling prices and/or lower weight, the shipping cost can be spread over multiple items, and the burden on the consumers or the retailers may be reduced.

Accordingly, embodiments of systems and methods described herein provide users with access to a weight-based shipping service that enables users to purchase a group of items and pay a flat shipping fee. These systems and methods can enable a user to combine certain items into a container (e.g., a box, carton, crate, tote, etc. of any shape) or set of containers based on weight for a reduced shipping cost. In addition, systems and methods described herein can recommend items to users for purchase based at least in part on the items that a user has added to a container, including based on remaining weight in the container.

For purposes of illustration, the processes disclosed herein are described primarily in the context of an interactive computing system that presents users with items available for purchase or other acquisition from an electronic catalog or catalog system. The interactive computing system can be implemented as a network resource or application, which may be a website, a mobile application, a combination of the same, or the like. As will be apparent, the disclosed processes can also be used in other types of systems, and can be used to access information regarding digital items, such as but not limited to, search results, news, real estate, social networking content, images, blogs, videos, music, movies, etc., as well as physical items.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term "item" is also sometimes used herein to refer only to the item itself or only to its representation in the computer system. Likewise, as used herein, the term "product," in addition to having its ordinary meaning, is used interchangeably to refer to a product itself (e.g., a particular product, service, any of the items referred to above, or the like) and to its description or representation in a computer system. As will be apparent from the context in which it is used, the term "product" is also sometimes used herein to refer only to the product itself or only to its representation in the computer system. Further, not necessarily all advantages described herein are shared by every embodiment of this disclosure.

Although weight is primarily used to describe the various embodiments discussed herein, other shipping parameters or constraints such as volume or a combination of weight and volume (or any other physical or logical metric) may also be used instead. In one embodiment, the volume of the item can be calculated as the volume of the container of that item. In another embodiment, the volume of the item can be calculated as a cubic volume or a smallest or approximately smallest cube in which the item fits. Where a weight is used or displayed in connection with an embodiment, a volume or a combination of the weight and volume may be used or displayed instead.

In the present disclosure, the terms "weight-based shipping container," "weight-based shipping box," "virtual shipping container," "container," and "box," in addition to having their ordinary meaning, are sometimes used interchangeably. Further, the terms "shipping parameter," "shipping constraint," and "shipping size," in addition to having their ordinary meaning, are sometimes used interchangeably.

II. Interactive Computing System Overview

Turning to FIG. 1, an example computing environment 100 is shown in which access to an interactive computing system 110 is provided to user devices 102 over a network 104. The interactive computing system 110 can represent a hardware platform or software platform (that is implemented using hardware) for which users can search and browse an electronic catalog of items.

When users of the user devices 102 connect to the interactive computing system 110 over the network 104, the interactive computing system 110 can provide the users with an electronic catalog that lists items that may be purchased by the users. The interactive computing system 110 may allow the user to browse or search the electronic catalog. The items that are listed in the electronic catalog may be eligible for different shipping rates. Some items may be eligible for free shipping, some items may be eligible for reduced shipping, and some items may be grouped together and shipped for a flat shipping fee. The interactive computing system 110 may indicate to the users that the applicable shipping charges will be waived if the total dollar value of the items to be shipped exceeds a threshold dollar value. In addition, the interactive computing system 110 can provide the users with a weight-based shipping service for some or all items on the electronic catalog. The weight-based shipping may include allowing users to fill up weight-based shipping containers having a fixed weight capacity (e.g., 45 lbs.). The users may choose to fill up as much or as little of the containers as they want, and each container may be shipped for a flat shipping fee. As the users are filling their weight-based shipping containers, various item recommendations may optionally be presented to the users to facilitate their shopping and/or shipping experience.

By way of illustration, various example user devices 102 are shown connecting to the interactive computing system 110, including a desktop computer, laptop, and a mobile phone. In general, the user devices 102 can be any computing device such as a desktop; laptop; mobile phone (or smartphone); tablet; kiosk; gaming console or controller; television; wristwatch (including a smartwatch); electronic book reader; wireless device; set-top box or other television box; media player; one or more processor devices; integrated circuit components for inclusion in computing devices, appliances, electronic devices for inclusion in vehicles, appliances, or machinery; etc. The user devices 102 access the interactive computing system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. Further, the interactive computing system 110 may be implemented in hardware and/or software and may, for instance, include one or more physical or virtual servers implemented on physical computer hardware configured to execute computer executable instructions for performing various features that will be described herein. The one or more servers may be geographically disbursed or geographically co-located, for instance, in one or more data centers.

In the depicted embodiment, the interactive computing system 110 includes servers 120, which can communicate with the user devices 102 over the network 104 and which can provide access to various services of the interactive computing system 110. The services of the interactive computing system 110 include, in the depicted embodiment, a search service 130, an electronic catalog service 140, a weight-based shipping service 150, and a recommendation service 160. These services 130, 140, 150, 160 can be implemented as software components executing in physical computer hardware on the servers 120 or in separate computing devices. Moreover, the processing of the various components or services of the interactive computing system 110 can be distributed across multiple machines, networks, or other computing resources. The various components or services of the interactive computing system 110 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the interactive computing system 110 can be stored in the memories of the servers 120 and/or on other types of non-transitory computer-readable storage media. While some examples of possible connections are shown, any subset of the components shown can communicate with any other subset of components in various implementations.

The search service 130 and the electronic catalog service 140 can provide users with access to an electronic catalog stored in an item data repository 170. The search service 130 and/or electronic catalog service 140 can provide users with access to the items in the electronic catalog by way of a network site, which may be a network resource such as a website or a mobile application. For example, the electronic catalog service 140 can generate network pages that include detailed information about particular items (e.g., item detail pages).

The electronic catalog may include information about items that may be purchased, rented, or otherwise accessed by the users of the user devices 102. The information in the electronic catalog can be hierarchically organized according to categories, subcategories, and the like. As described above, the electronic catalog information contained in the item data repository 160 can include items other than products or services, such as blogs, periodicals, social networking profiles, or the like.

The weight-based shipping service 150 of the interactive computing system 110 can provide a user with a shipping method in which the cost of shipping the items selected by the user is determined based on the combined weight of the items. For example, the weight-based shipping service 150 may provide the user with the ability to fill up a box (or any shipping container) having a fixed weight capacity (e.g., 45 lbs.) with items selected from the electronic catalog, and the user may pay a flat shipping fee for having that box shipped to him or her. The box having a flat shipping fee associated therewith may be referred to as a flat rate box, a flat rate container, or a flat rate physical shipping container. By combining multiple items that may otherwise result in separate shipping charges into a single box, the user may be able to save some money on shipping. In addition, by allowing the user to combine the items into a single box, the shipper (e.g., an electronic retailer), who may otherwise incur separate shipping charges for shipping each of the items, may save money on shipping.

With continued reference to FIG. the weight-based shipping service 150 includes a box allocation module 152 in the depicted embodiment. The box allocation module 152 can perform various tasks associated with providing a weight-based shipping service to the users of the interactive computing system 110. Since the weight-based shipping service provided to the user involves calculating the shipping fee based on the total weight of the items, the box allocation module 152 may determine the weight of the items by accessing the item data repository 170 and examining item attributes 172 of the items added to the box(es). For example, the item attributes 172 of an item may indicate the actual weight of the item, the dimensions of the item, and/or the actual volume of the item. The box allocation module 152 may use the actual weight of the item, the dimensions of the items, and/or the volume of the item in determining whether the item would fit in the existing box(es) or a new box is desired. Additional details for determining item weights are described in greater detail below with respect to FIGS. 3A and 3B.

With continued reference to FIG. 1, the recommendation service 160 of the interactive computing system 110 can provide users with item recommendations while they are browsing the electronic catalog, based on information contained in the item data repository 170 (such as any item association data generated based on observed user behavior with respect to item views and/or purchases), and the user data repository 180 (such as the particular user's purchase, searching, or browsing history). As discussed above, in the depicted embodiment, the item data repository 170 includes item attributes 172, which may include various attributes of the items in the electronic catalog. The attributes may include one or more actual weight, product weight, packaging weight, dimensional weight, dimensions, actual volume, price, item type, etc. Dimensional weight may be calculated in different ways. One example of a dimensional weight calculation is the volume of the item multiplied by a predetermined density. Other dimensional weight examples are described below. The user data repository 180 may store user data including membership type, purchase history, browsing history, search history, etc.

In the depicted embodiment, the recommendation service 160 includes a box completion recommender 162 and a bundle recommender 164. The box completion recommender 162 may provide the user with item recommendations that may be used to fill up the remaining space in the user's existing weight-based shipping box(es). Additional details for providing item recommendations are described in greater detail below with respect to FIG. 4.

The bundle recommender 164 can provide the user with bundle recommendations (e.g., boxes full of pre-selected items). Based on recommendation techniques described in greater detail below, the bundle recommender 164 can assemble one or more boxes that contain items that may be of the user's interest. The bundle recommender 164 may recommend bundles assembled by a vendor who sells items through the interactive computing system 110 based on a particular theme. Additional details for providing bundle recommendations are described in greater detail below with respect to FIG. 5.

III. Example Weight-Based Shipping Processes

Figure 2:
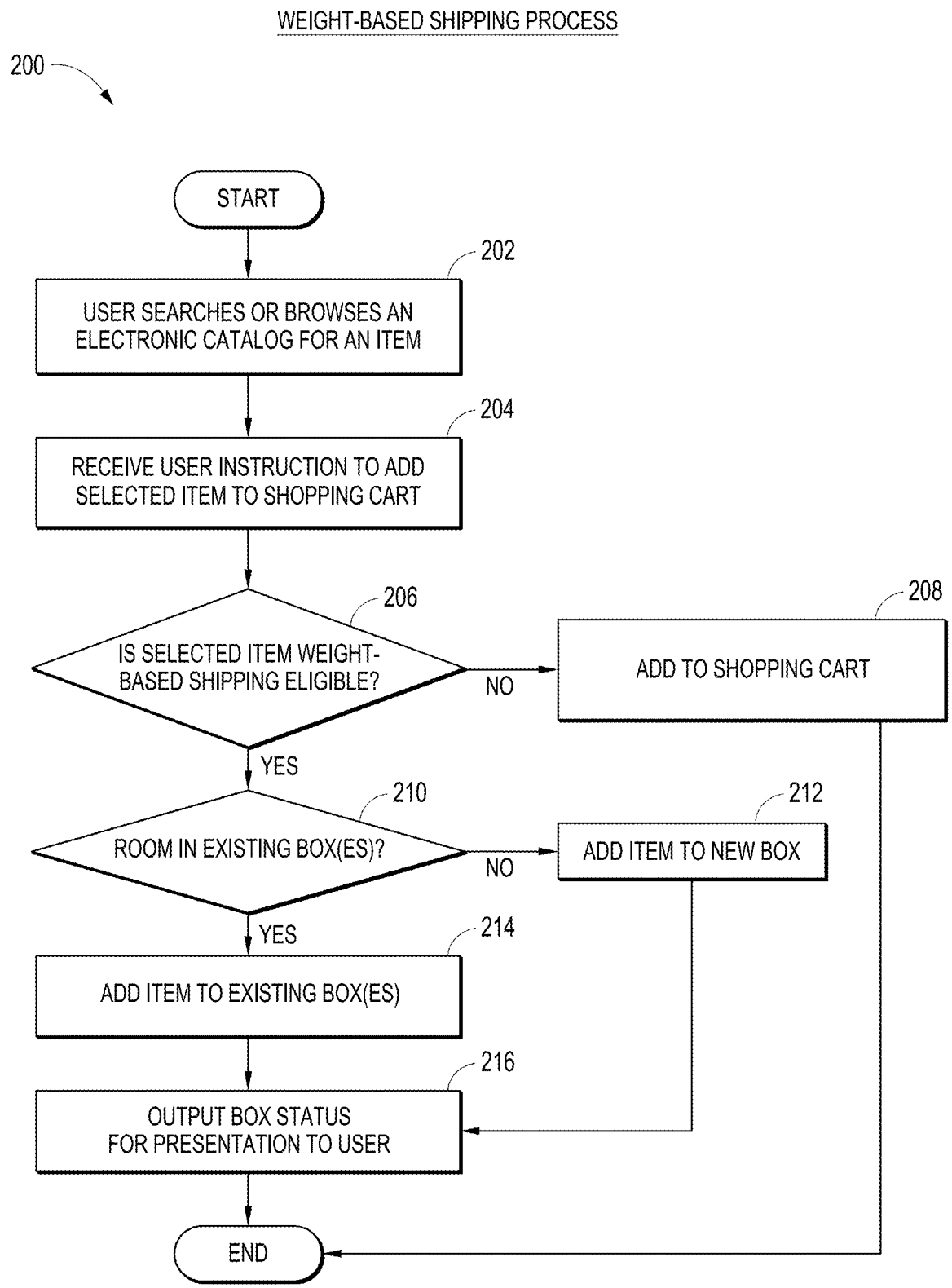
FIG. 2 depicts an embodiment of a weight-based shipping process.
Figure 3A:
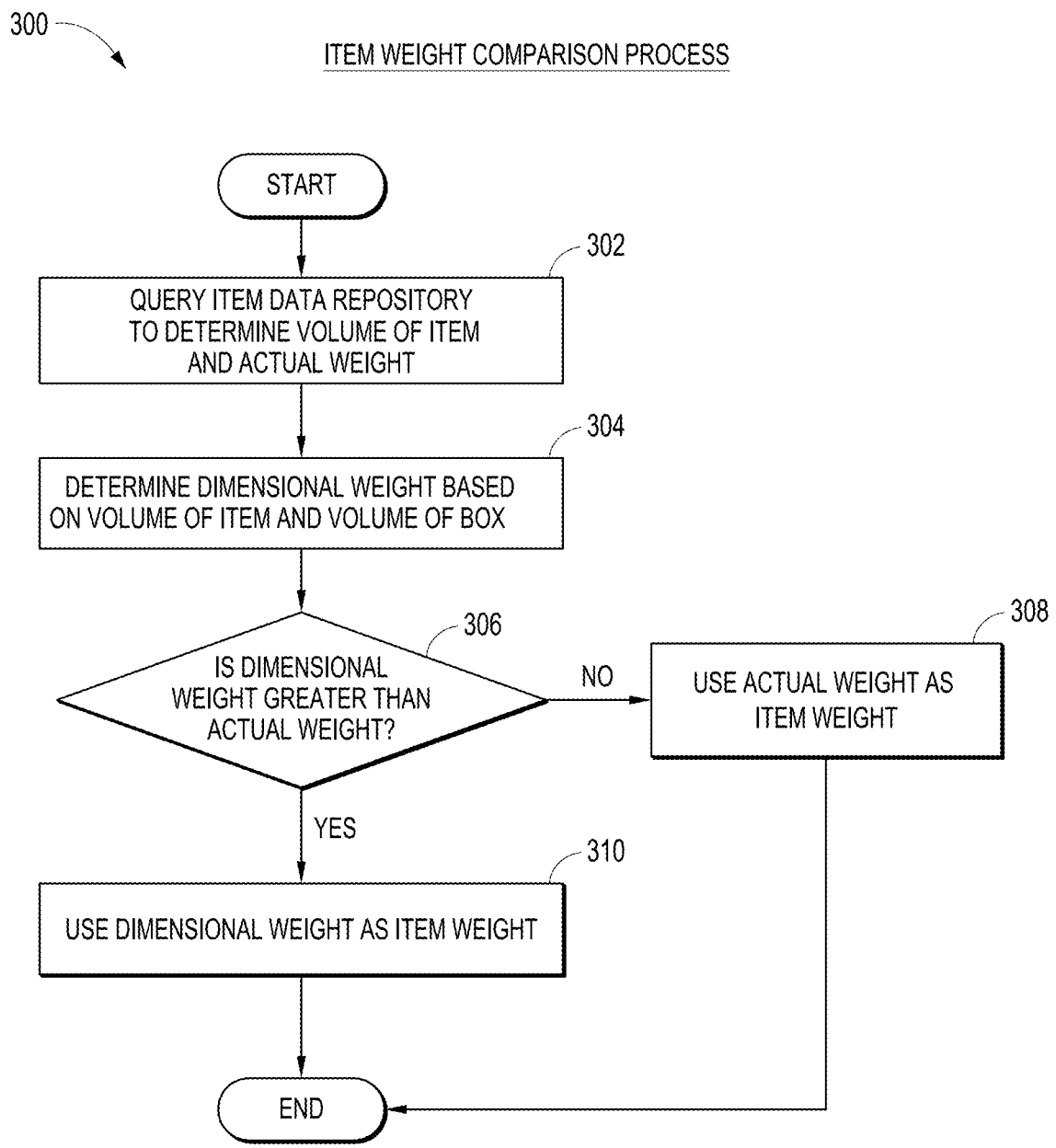
FIG. 3A depicts an embodiment of an item weight comparison process.
Figure 3B:
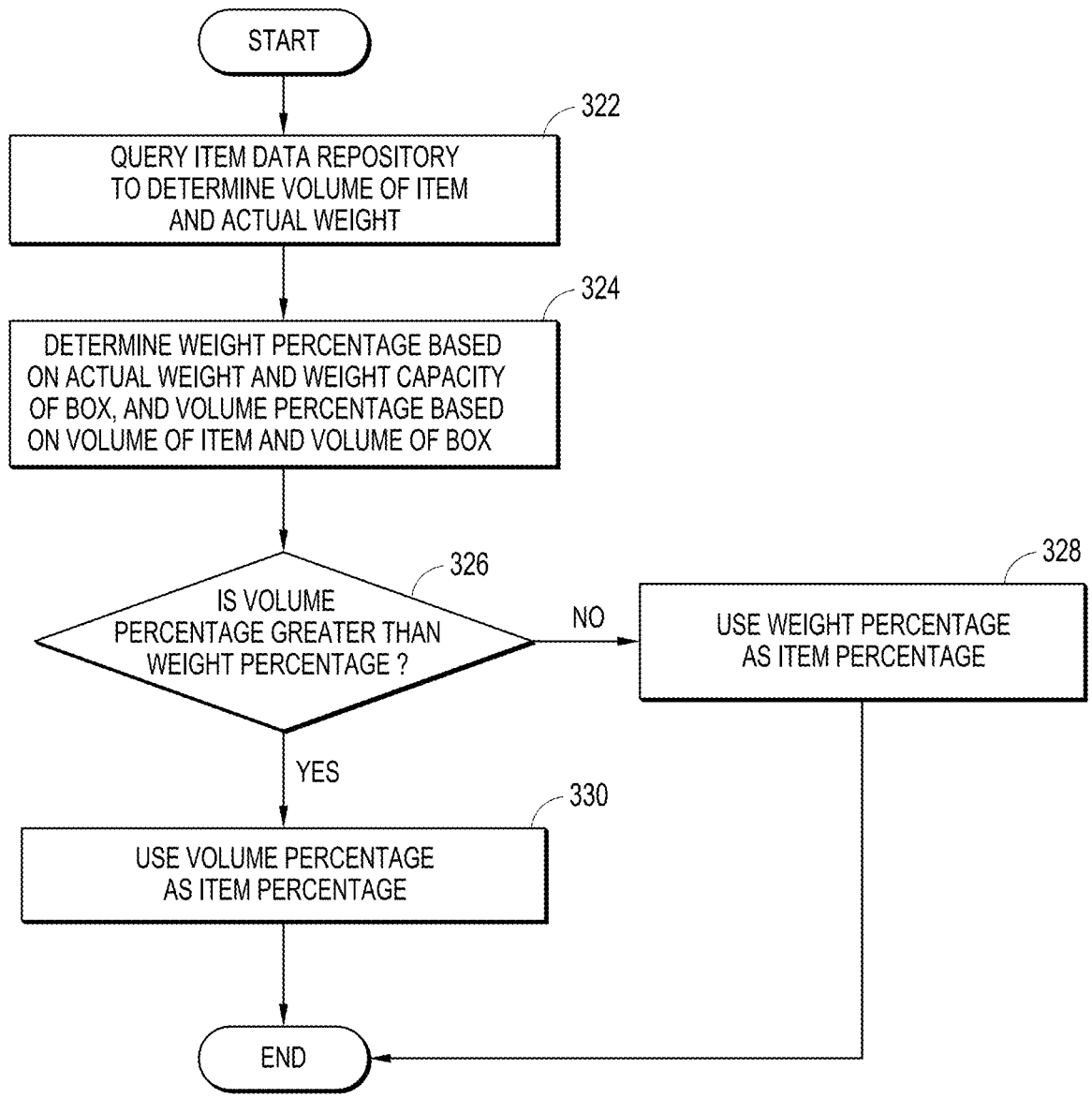
FIG. 3B depicts an embodiment of an item capacity comparison process.
Figure 4:
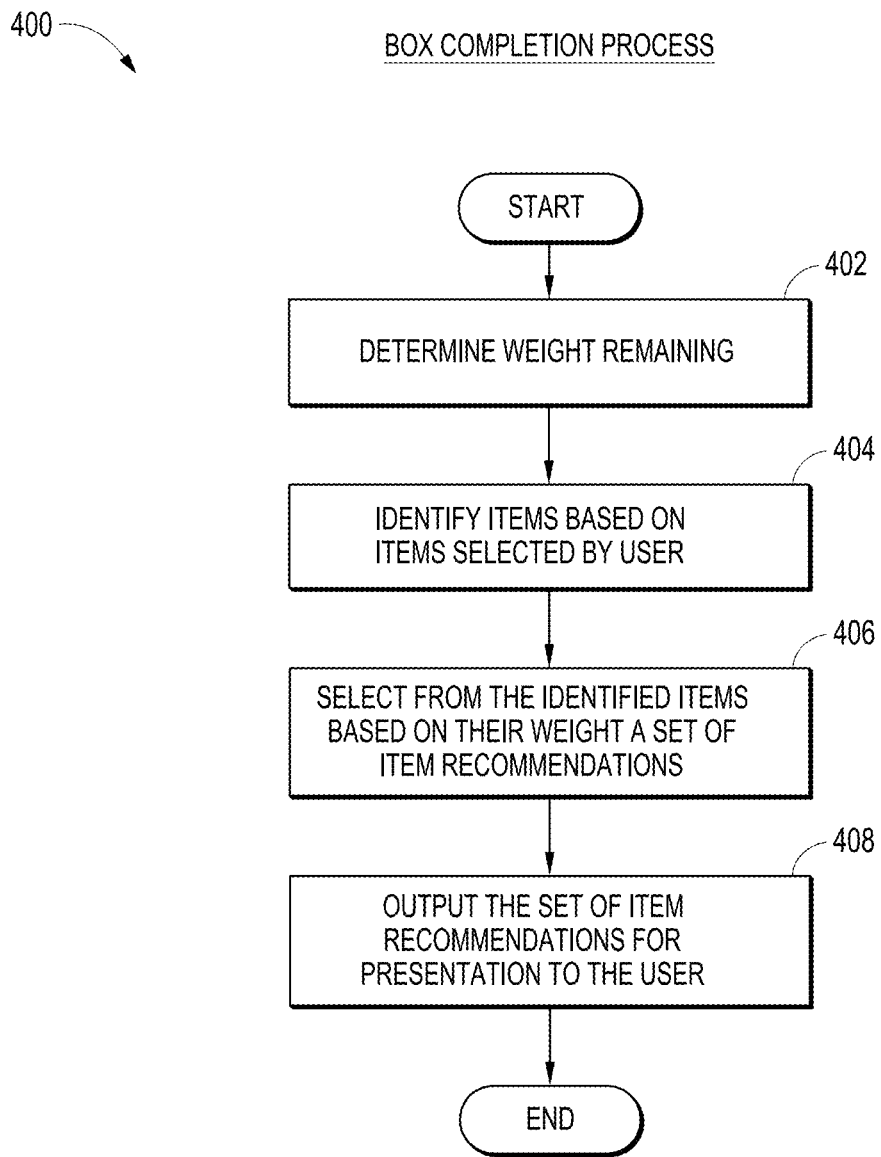
FIG. 4 depicts an embodiment of a container completion process.
Figure 5:
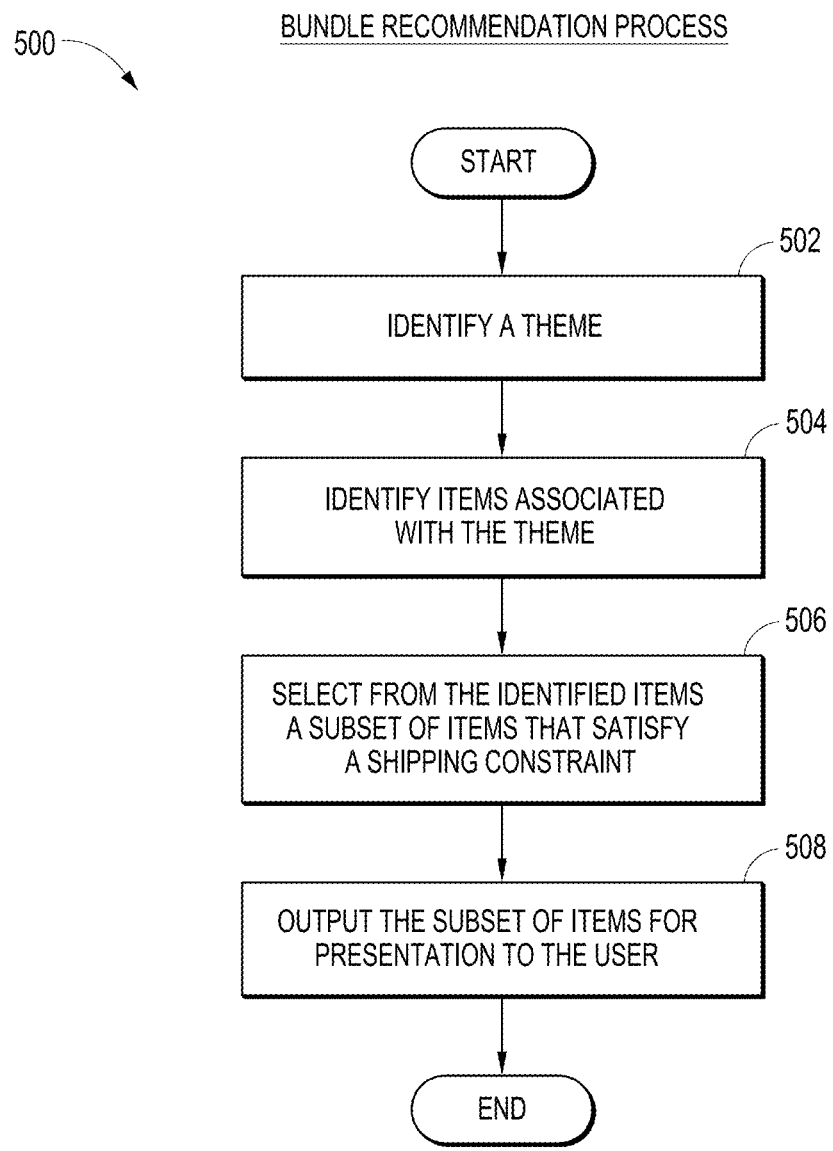
FIG. 5 depicts an embodiment of a bundle recommendation process.

Turning to FIGS. 2 through 5, example processes 200, 300, 400, and 500 that may be implemented by the interactive computing system 110 are shown. In particular, FIG. 2 depicts a weight-based shipping process 200, FIG. 3A depicts an item weight comparison process 300, FIG. 4 depicts a box completion process 400, and FIG. 5 depicts a bundle recommendation process 500. For convenience, the processes 200, 300, 400, and 500 will be described in the context of the devices and systems shown in FIG. 1. However, it should be understood that the processes 200, 300, 400, and 500 can be implemented by any computing device and not just the computing devices shown in FIG. 1.

With specific reference to FIG. 2, in the weight-based shipping process 200, a user of one of the user devices 102 can fill up one or more weight-based shipping containers with weight-based shipping eligible items and pay a flat shipping fee for each weight-based shipping container that he or she has used.

At block 202 of the process 200, the user searches or browses an electronic catalog for an item. As discussed above, the search service 130 and the electronic catalog service 140 may provide the user with an electronic catalog that includes a variety of items that the user can purchase. The electronic catalog may indicate whether a particular item listed therein is eligible for weight-based shipping. At block 204, the weight-based shipping service 150 receives a user instruction to add an item selected by the user to the shopping cart. In one embodiment, the search service 130 and the electronic catalog service 140 provide the user with search results based on a search term provided by the user, and the user adds an item in the search results straight to the shopping cart without having to view the item detail page. In another embodiment, the user browses the electronic catalog, selects an item, views the item detail page, and adds the item to the shopping cart from the item detail page. Although not shown in FIG. 2, in one embodiment, the weight-based shipping service 150 determines whether the user is eligible to use the weight-based shipping service. For example, the weight-based shipping service 150 may access the user data repository 180 to determine whether the user is a member of a particular group (e.g., based on payment of a fee, based on a subscription, based on a VIP status, etc.). If the weight-based shipping service 150 determines that the user is a member of the particular group, the weight-based shipping service 150 may proceed to block 206, and otherwise, it may jump to block 208.

Figure 12:
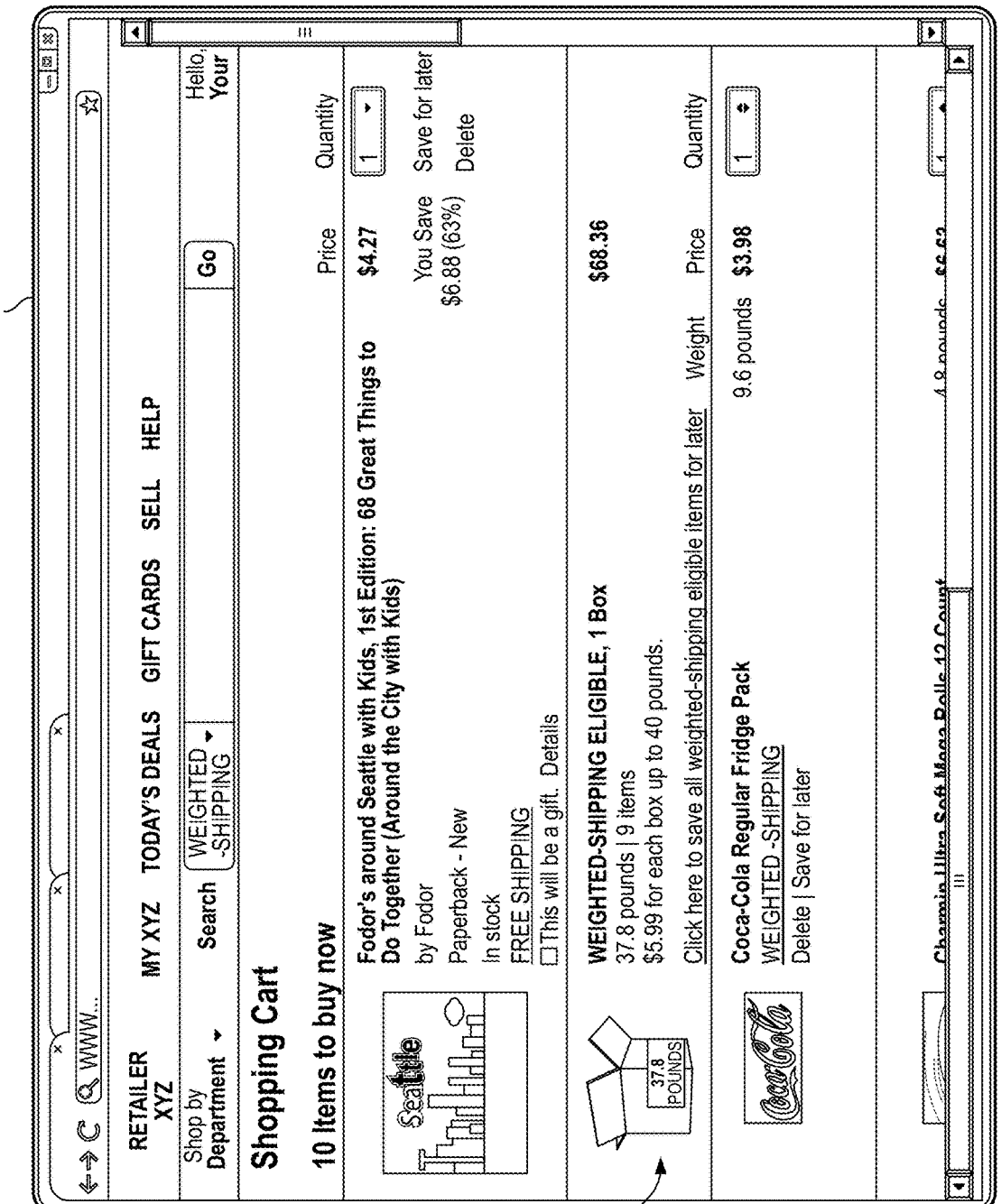
FIG. 12 depicts an example graphical user interface that provides an electronic shopping cart.

Once the weight-based shipping service 150 receives the user instruction to add the selected item to the shopping cart, at block 206, the weight-based shipping service 150 (e.g., via the box allocation module 152) determines whether the selected item is eligible for weight-based shipping. The electronic catalog may also indicate whether a particular item is eligible for weight-based shipping. In one embodiment, the weight-based shipping service 150 provides a section in the electronic catalog in which weight-based shipping eligible items are displayed together. In such a section of the electronic catalog, the indication of whether a particular item is eligible for weight-based shipping may be omitted. In another embodiment, the eligibility of an item for weight-based shipping is determined when the user adds the item to the shopping cart. The box allocation module 152 may place items in different sections of the shopping cart based on weight-based shipping eligibility. For example, as illustrated in FIG. 12, the weight-based shipping eligible items may be grouped and displayed together.

If the weight-based shipping service 150 determines that the selected item is not eligible for weight-based shipping, at block 208, the weight-based shipping service 150 adds the selected item to an electronic shopping cart separate from weight-based shipping items. On the other hand, if the weight-based shipping service 150 determines that the selected item is eligible for weight-based shipping, at block 210, the weight-based shipping service 150 further determines whether there is room (e.g., based on weight, volume, or any other physical or logical metric) in the existing box(es) (e.g., weight-based shipping containers).

For example, as the user adds items from the electronic catalog to his or her box, the box allocation module 152 may add up the weights of the items. As discussed further in connection with the process 300 of FIG. 3A, the weight of the item used to calculate the total weight of the items in the box(es) may be the actual weight of the item or the dimensional weight of the item. Based on the total weight of the items currently in the box, the maximum capacity of the box(es), and the weight of the item newly being added, the box allocation module 152 can determine the currently available capacity of the existing boxes to fit the selected item. For example, the box allocation module 152 can determine whether there is enough room (e.g., based on weight, volume, or any other physical or logical metric) in the existing box(es) to fit the selected item. Although the box allocation module 152 can determine the available capacity of a physical box, the box allocation module 152 need not determine the available capacity of a specific physical box. For example, the box allocation module 152 need not determine box capacity based on data representing an actual box filled in a warehouse with actual goods. Rather, the box allocation module 152 may determine a representation of what a physical box's capacity would be if one or more items were added to the physical box. In other embodiments, the box allocation module 152 communicates with a warehouse in real time to determine actual box contents and box capacity.

In one embodiment, the box allocation module 152 provides to the user a box status (e.g., via a user interface display) indicating the total weight of the items placed in the box(es), the number of boxes used by the user thus far, and the remaining box capacity in the existing box(es) until another box would be desired (e.g., how many pounds to go until the user has to pay for an additional box). An example of such a box status presented to the user is shown in FIG. 8, which is further discussed below. The weight of the items may be displayed along with the corresponding items in the electronic catalog. The weight of the items may be stored (e.g., in the item data repository 170 of FIG. 1) along with other item information associated with the items in the electronic catalog. In addition, each item in the electronic catalog may be displayed along with an indication of what the remaining box capacity would be if the item were added to the existing box. For example, in connection with an item in the electronic catalog, a graphical user interface displayed to the user may provide how much of the box the item occupies (e.g., by weight, volume, and the like) and what the remaining box capacity would be if the item were added to the existing box(es). The value indicating what the remaining box capacity would be may be calculated by subtracting the weight of the item from the current remaining box capacity. Alternatively, the value may be calculated by subtracting the total weight of the items (including the item to be added) from the total box capacity of the existing box(es).

In one embodiment, whether an additional box is to be used is determined based on the total weight of the added items. For example, if the box capacity is 45 lbs and nine items having an individual weight of 10 lbs are added, the total weight would be 90 lbs, and dividing the total weight by the box capacity, the box allocation module 152 determines that two boxes can be used. In another embodiment, whether an additional box might be desirable is determined on a box-by-box basis (e.g., by determining whether the items would physically fit in the existing boxes, either weight-wise, volume-wise, etc.). For example, if the user has added eight 10-lb items so far and wishes to add an additional 10-lb item, the box allocation module 152 may determine that, since each of the existing boxes would only hold four of the items, an additional box can be used to hold the additional 10-lb item.

Figure 11A:
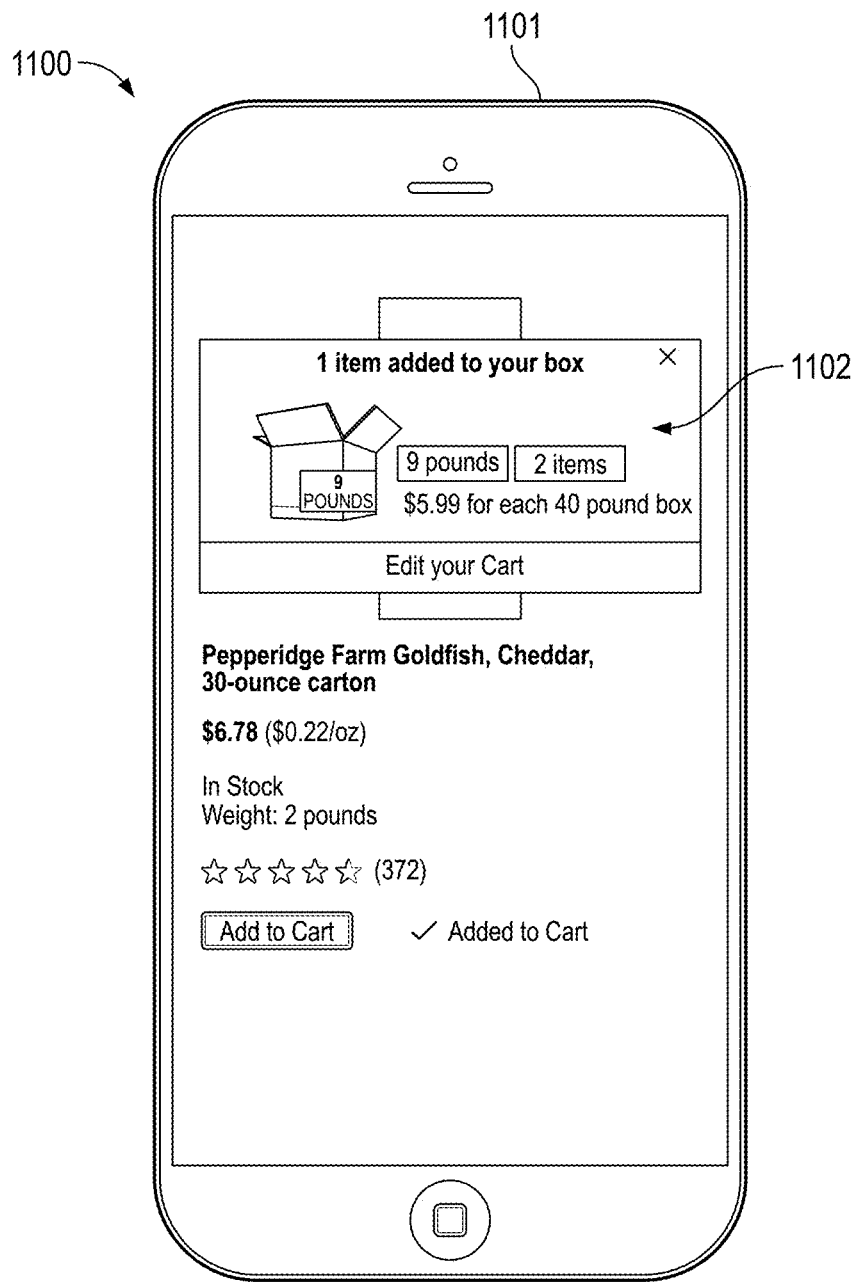
FIG. 11A depicts an example graphical user interface that provides a status of existing container(s).
Figure 11B:
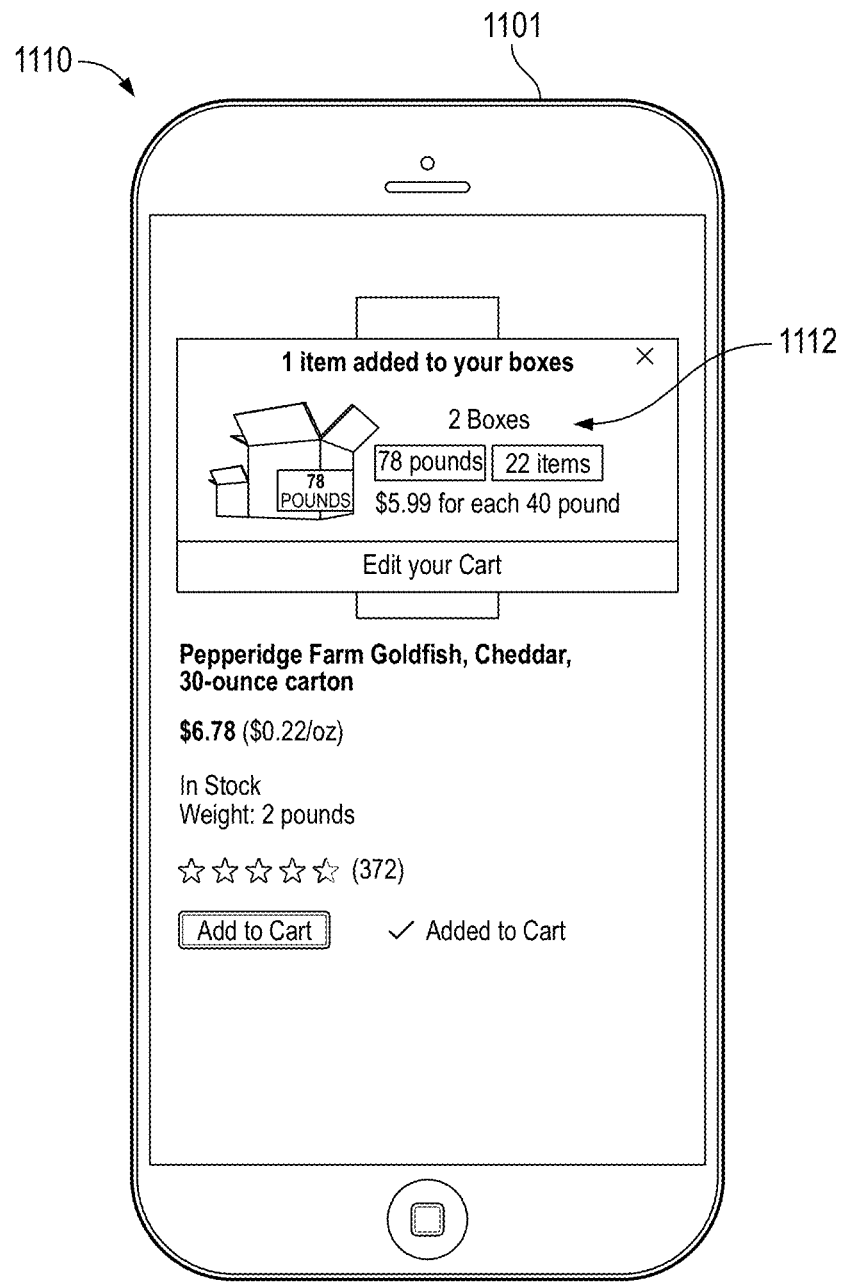
FIG. 11B depicts another example graphical user interface that provides a status of existing container(s).
Figure 11C:
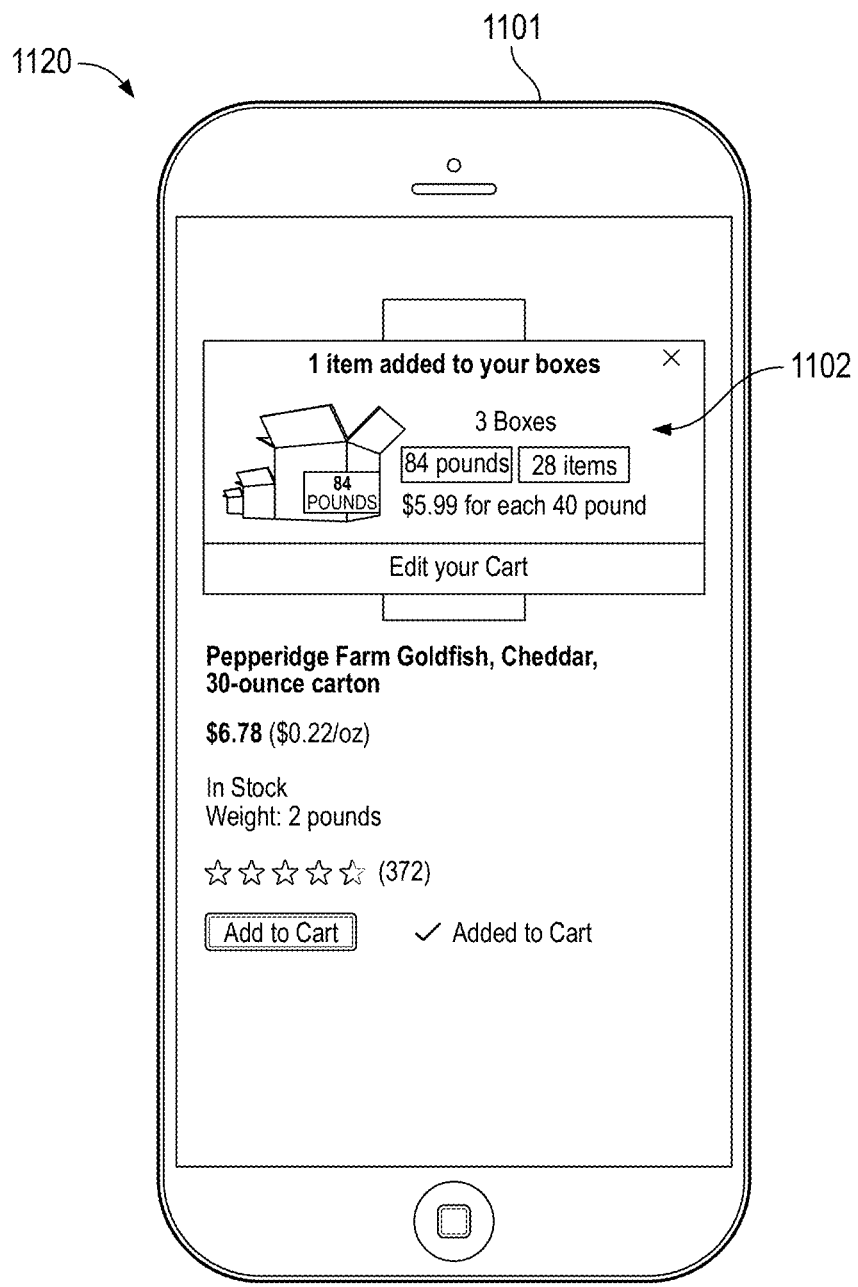
FIG. 11C depicts yet another example graphical user interface that provides a status of existing container(s).

With continued reference to FIG. 2, if the weight-based shipping service 150 determines that there is not enough room (e.g., based on weight, volume, shape, or any other physical or logical metric) in the existing box(es) to add the selected item, at block 212, the weight-based shipping service 150 adds the selected item to a new box. On the other hand, if the weight-based shipping service 150 determines that there is enough room in the existing box(es) to fit the selected item, at block 214, the weight-based shipping service 150 adds the selected item to the existing box(es). For example, as shown in FIGS. 11A-11C, as the user adds items, additional boxes are added as existing boxes are filled up. In the example of FIGS. 11A-11C, the user starts with a single box in FIG. 11A, and another box is added to the user's cart when the total weight of the items added exceeds 40 lbs (e.g., box capacity), as shown in FIG. 11B. As shown in FIG. 11C, yet another box is added when the total weight of the items added exceeds 80 lbs (e.g., capacity of two boxes). In one example, the determination at block 210 is omitted, and the weight-based shipping eligible item is added to the box, and the weight-based shipping service 150 (e.g., via the box allocation module 152) determines whether to add a new box based on the remaining box capacity and the weight of the item.

In one embodiment, if the total weight of the items selected for purchase by the user exceeds the capacity of the initial box, the weight-based shipping service 150 allows the user to pay the same (or other) flat shipping fee for an additional box. In one embodiment, the box allocation module 152 automatically adds another box if the capacity of the existing box(es) is exceeded. In another embodiment, the box allocation module 152 outputs a message for presentation to the user, indicating that a new box is going to be added. In another embodiment, the user fills up as many boxes as he or she wants and pays a flat shipping fee for each box that he or she used.

In one embodiment, the box allocation module 152 prompts the user, when a new box is to be added, to select from multiple boxes having different weight capacities. For example, the user may select from a 10-lb box, a 20-lb box, and a 45-lb box. The box capacity is not limited to those discussed herein, and may be any arbitrary weight value. In another embodiment, the box allocation module 152 allows the user to specify a default box type that can be automatically chosen when additional boxes are desired. Each of the boxes may have different shipping fees and/or expected delivery times. For example, some boxes may be shipped by ground, some boxes may be shipped by air, and some boxes may be delivered using drones (e.g., unmanned flying robots or vehicles such as helicopters or planes that can carry and deliver the boxes to the users).

Figure 9A:
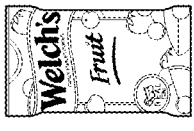
FIG. 9A depicts an example graphical user interface that provides a status of existing container(s).
Figure 9B:
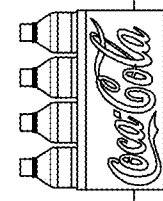
FIG. 9B depicts another example graphical user interface that provides a status of existing container(s).

After the selected item is added, at block 216, the weight-based shipping service 150 outputs a box status for presentation to the user. Examples of such a presentation are shown in FIGS. 9A and 9B, which are described in detail below.

Turning to FIG. 3A, an item weight comparison process 300 is shown. As discussed above, the weight of the item (e.g., item weight) used to determine whether an additional box would be desired (e.g., block 210 of FIG. 2) may be the actual weight of the item or the dimensional weight of the item. The item weight comparison process 300 can compare the actual weight and the dimensional weight of an item to determine which of the two weights would be more appropriate to be used for calculating the shipping weight in providing the weight-based shipping service to the users. Shipping costs have traditionally been calculated based on the actual weight of the item being shipped. However, if the density of the item is low enough (e.g., an item that is relatively light but has a high volume), it may not make financial sense for the shipper to calculate the shipping cost for shipping the item solely based on the actual weight. If weight were the only factor, such item would then have a low shipping cost based on its low weight despite the large volume it occupies in the shipping container. For example, if the user adds an item that weighs 5 lbs but occupies half of the 45-lb box, it would not make sense to allow the user to place more than 2 of those items in a single box (e.g., any more would not physically fit into the box). Thus, in such cases, the dimensional weight of the item may be used instead of the actual weight. Thus, by comparing the actual weight and the dimensional weight (which may be calculated based on the volume of the item), and then choosing the weight that is more appropriate for the particular item, the weight-based shipping service 150 may spread the shipping cost more appropriately among the items.

At block 302 of the process 300, the box allocation module 152 of the weight-based shipping service 150 queries the item data repository 170 to determine the volume and the actual weight of an item (e.g., an item that is selected by the user). The actual weight of the item may be the product weight plus the packaging weight. Thus, in one embodiment, the box allocation 152 may determine the actual weight of an item by adding the product weight and the packaging weight of the item (e.g., which may be obtained from the item data repository 170). The actual weight and the volume of the item may be looked up (e.g., from a table or some other database stored in the item data repository 170) using a unique item ID associated with the item. The volume of the item may be the actual volume of the item or the volume of the smallest rectangular box that would fit the item.

Once the volume and the actual weight of the item are obtained from the item data repository 170, the box allocation module 152 determines the dimensional weight of the item based on the volume of the item and the volume of a weight-based shipping container (e.g., a fixed-size box that is used for weight-based shipping) at block 304. The dimensional weight may also be referred to as an adjusted shipping weight. In one embodiment, the dimensional weight may be calculated by equation (1) shown below.

$$\text{Dimensional Weight} = [(\text{weight capacity of box})/(\text{volume of box})] \times (\text{volume of item}) \quad (1)$$

As used herein, in addition to having its ordinary meaning, the term "box" may refer to a physical box itself or its digital representation in the interactive computing system 110. In addition, the term "box," in addition to having its ordinary meaning, is not limited to an actual box, and may include any physical shipping container (e.g., a flat rate physical shipping container) that may be used to ship items that are eligible for weight-based shipping. In some examples, the dimensional weight may also be referred to as the adjusted shipping weight.

As shown in the above equation, the weight capacity of the box is divided by the box volume to determine the weight per unit volume (e.g., average density of the filled box), which is then multiplied by the volume of the item to determine the dimensional weight. Thus, the dimensional weight is calculated based on what portion of the box the item would occupy. In one example, if the boxes used for weight-based shipping has a certain maximum capacity, but the boxes are to be filled only to the 90% mark to leave room for packaging or protective materials, the weight capacity of the box would be considered to be 90% of the maximum capacity.

With continued reference to FIG. 3A, at block 306, the box allocation module 152 checks whether the dimensional weight of the item is greater than the actual weight of the item. If the box allocation module 152 determines that the dimensional weight is greater than the actual weight, at block 310, the box allocation module 152 uses the dimensional weight as the item weight. The item weight may be used by the box allocation module 152 to determine whether the item would fit in an existing box or whether the user has to pay for another box (e.g., the flat rate for shipping the box) in order to add the item to the shopping cart. On the other hand, if the box allocation module 152 determines that the dimensional weight is not greater than the actual weight, at block 308, the box allocation module 152 uses the actual weight as the item weight for determining whether the item would fit in the existing box(es). The process of determining whether to use the actual weight or the dimensional weight may be summarized by equation (2) shown below.

$$\text{Item Weight} = \text{Max}(\text{actual weight}, \text{dimensional weight}) \quad (2)$$

Thus, according to the above equation, for the purpose of determining how many boxes are to be used for shipping the weight-based shipping eligible items selected by the user, the box allocation module 152 may use whichever weight that is greater between the actual weight and the dimensional weight. Thus, in the example discussed above, if an item takes up half of the box, the dimensional weight of the item would be the weight capacity of the box multiplied by (½). In the case of a 45-lbs box, the dimensional weight of the item would be 22.5 lbs, which is greater than the actual weight of the item, which is 5 lbs in this case. Thus, according to the equation above, the box allocation module 152 would use the dimensional weight (22.5 lbs) instead of the actual weight (5 lbs) when filling up the boxes. However, this calculation is optional in some embodiments, such that only actual weight is used or only dimensional weight is used to calculate available space in one or more boxes.

Figure 6A:
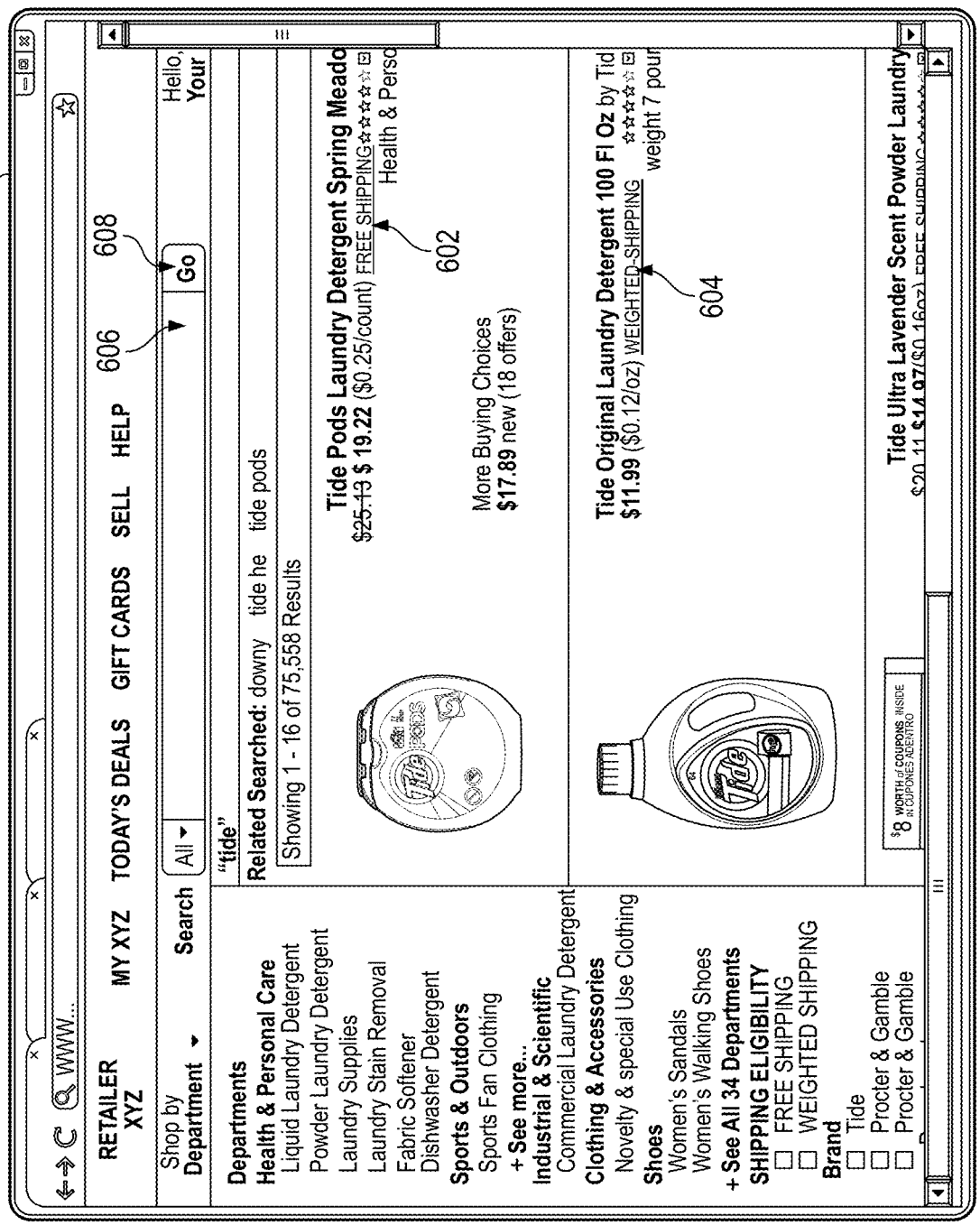
FIG. 6A depicts an example graphical user interface that provides access to an electronic catalog.

FIG. 3B illustrates an example item percentage comparison process 320. In some embodiments, the process 320 is performed instead of the process 300 illustrated in FIG. 3A. For example, instead of "item weight" that is determined in the process 300, "item percentage" may be determined in the process 320 and used in connection with one or more embodiments discussed herein. For example, the electronic catalog may display the item percentage as illustrated in the example of FIG. 6B described below (e.g., instead of the item weight, as illustrated in FIG. 6A, also described below).

At block 322, the box allocation module 152 of the weight-based shipping service 150 queries the item data repository 170 to determine the volume and the actual weight of an item. At block 324, the box allocation module 152 determines a weight percentage based on the actual weight and the weight capacity of the box, and a volume percentage based on the volume of the item and the volume of the box. For example, the weight percentage may be determined by dividing the actual weight by the weight capacity of the box, and the volume percentage may be determined by dividing the volume of the item by the volume of the box. At block 326, the box allocation module 152 determines whether the volume percentage is greater than the weight percentage. If the box allocation module 152 determines that the volume percentage is greater than the weight percentage, at block 330, the box allocation module 152 uses the volume percentage as the item percentage (e.g., percentage of the box capacity occupied by the item). The item percentage may be used by the box allocation module 152 to determine whether the item would fit in an existing box or whether the user has to pay for another box (e.g., the flat rate for shipping the box) in order to add the item to the shopping cart. On the other hand, if the box allocation module 152 determines that the volume percentage is not greater than the weight percentage, at block 328, the box allocation module 152 uses the weight percentage as the item percentage for determining whether the item would fit in the existing box(es).

In one embodiment, one or more of the processes 300 and 320 are performed in response to the items being added to the electronic catalog. For example, the processes 300 and/or 320 may be performed independently of the user's buying experience. In another embodiment, one or more of the processes 300 and 320 are performed when the user is adding the item to his or her shopping cart or shortly thereafter. For example, the determination of the item weight or item percentage may be based on the current box status. If the user's weight-based shipping container is almost full volume-wise but still empty weight-wise, the box allocation module 152 may allow relatively heavy but small items to go into the existing box (even if the item weight or item percentage of the item would normally be too high to fit into the box). Similarly, if the container is almost full weight-wise but still empty volume-wise, the box allocation module 152 may allow relatively big but light items to go into the existing box (even if the item weight or item percentage of the item would normally be too high to fit into the box).

In addition to the processes (e.g., processes 200, 300, and 320) performed by the weight-based shipping service 150, the recommendation service 160 may perform one or more processes to provide item recommendations to the user as the user is browsing the electronic catalog and adding items to his or her weight-based shipping container(s). Such processes may include a process of recommending items that would complete (e.g., fill up) the existing boxes (e.g., as illustrated in FIG. 4, described below), and/or a process for recommending one or more completed boxes that may have been assembled based on a common theme (e.g., as illustrated in FIG. 5, also described below).

Turning to FIG. 4, a box completion process 400 is shown. The box completion process 400 can make various item recommendations to the user so that the user can more easily fill up the remaining space in the existing box(es). In some embodiments, by increasing or otherwise maximizing the box weight, the user can take advantage of the benefits offered by weight-based shipping to the fullest extent.

At block 402 of the process 400, the box completion recommender 162 determines the remaining box capacity in the existing box(es). For example, if the box capacity is 45 lbs, and the user has added items that add up to 40 lbs, the box completion recommender 162 may recommend items that are 5 lbs or less. In one example, the box completion recommender 162 determines the remaining box capacity by dividing the total weight of the items added, and subtracting the remainder from the box capacity (e.g., 45 lbs). In another example, the box completion recommender 162 communicates with the box allocation module 152 of the weight-based shipping service 150 to obtain the remaining box capacity. At block 404, the box completion recommender 162 identifies items based on the items selected by the user. The items selected by the user may include the items currently selected and added to the weight-based shipping box(es). In another embodiment, the items selected by the user include items that were previously selected by the user in a browsing or search session.

Any of the recommendation techniques known or discussed herein may be used to identify the items to recommend to the user. In some embodiments, the recommendation service 160 analyzes the user data in the user data repository 180 to determine which items could be associated with other items based on, for example, user behavior. In certain embodiments, the recommendation service 160 analyzes item selections by users to determine, for example, the likelihood that a person who selected item A would have also selected item B. Item selections can include user actions such as purchases, views, downloads, rentals, clicks, combinations of the same, and the like. For example, the recommendation service 160 can estimate the likelihood that a person who bought item A would have also bought item B.

If the recommendation service 160 determines that a user who bought A would have also likely bought B, then the recommendation service 160 can generate an association or similarity between these two items. The recommendation service 160 may also generate a score that indicates a degree of association between the items. In certain embodiments, the recommendation service 160 generates associations by determining a number of users who actually bought both items A and B and also by estimating how many users might have bought both items A and B due to random chance. The more users who actually bought both items A and B, the higher the degree of association could be between those items. Conversely, the more users who were estimated to buy both A and B due to random chance, the lower the degree of association could be between those items. Advantageously, in certain embodiments, the recommendation service 160 estimates the random overlap between A and B by taking into account the number of purchases of some or all users who also bought item A.

The recommendation service 160 may store the association, along with its score, as a mapping between items in a table or other data structure in the item data repository 170, the user data repository 180, or a separate associations data repository (not shown). Thereafter, the recommendation service 160 can retrieve the associations between items from one of such data repositories, and use the associations, together with user data about a specific user, to generate personalized item recommendations for that user. Example techniques for generating personalized item recommendations using associations (sometimes referred to as similarities) are described in U.S. Publication No. 2002/0198882, filed Jan. 14, 2002, titled "Content Personalization Based on Actions Performed During a Current Browsing Session," the disclosure of which is hereby incorporated by reference in its entirety. The recommendation service 160 may also output the recommendations for presentation (e.g., display on a web page, email, text, etc.) to the user. Thus, in certain embodiments, the recommendation service 160 transforms the associations and/or user data into recommendations that further represent physical items.

The recommendation service 160 can use any of a variety of algorithms for generating recommendations, including various behavior-based algorithms. In some embodiments, such behavior-based algorithms can analyze user behavior to generate item-to-item similarity mappings and can use these mappings to recommend items related to a user's item selection activities. Examples of such recommendation algorithms, which can be used herein, are described in U.S. Publication No. 2002/0198882, referenced above.

Based on the techniques discussed above, the box completion recommender 162 identifies items that may be of interest to the user, based on the items selected by the user. As discussed above, the item recommendations provided by the box completion recommender 162 may be based on what the user currently has in his or her shopping cart or weight-based shipping containers (e.g., one or more fixed-size boxes), based on the user's prior purchase, search or browsing history, or both. The item recommendations may also be based on any item association or similarity formed between the selected item and other items in the electronic catalog, or the scores generated between the selected item and other items in the electronic catalog, indicating the degrees of association therebetween. In other words, the item recommendations may be based what other people bought, searched, or viewed together, in the same browsing session or otherwise, and/or what this particular user has bought, searched, or viewed together, in the same browsing session or otherwise.

With continued reference to FIG. 4, at block 406, the box completion recommender 162 selects a set of item recommendations from the identified items, based on the weight of the items. As discussed above, such item recommendations may also be determined based on item percentage, item volume, or any other metric. For example, the identified items may be sorted by weight, and the items having a weight that is less than the remaining box capacity may be selected. In another example, the identified items may be filtered to remove any items that would not fit (e.g., based on item weight, item percentage, or any other physical or logical metric) into the existing box(es). The box completion recommender 162 may recommend single items or a group of items. For example, in the example above, the box completion recommender 162 may determine that the user has added cleaning supplies to the existing box(es) and recommend two or three additional items in the cleaning supplies category that have a combined weight of 5 lbs (e.g., remaining box capacity). In one embodiment, the box completion recommender 162 recommends solely items that are eligible for weight-based shipping. In another embodiment, the box completion recommender 162 recommends both items that are eligible for weight-based shipping and items not eligible, and the user can select from either set of recommended items.

At block 408, the box completion recommender 162 outputs the set of item recommendations for presentation to the user. For example, the set of item recommendations may be displayed to the user on the user device 102, while the user is browsing the electronic catalog or viewing the item detail page of a particular item. For example, when the user selects a particular item in the electronic catalog, the electronic catalog service 140 may display detailed information of the selected item. In addition to the detailed information of the selected item, the recommendations service 160 may provide a list of other items that the user may be interested in viewing or purchasing, based on the user's purchase, search, or browsing history, or any item association or similarity formed between the selected item and other items in the electronic catalog. In one embodiment, the item recommendations are displayed to the user after the user adds an item, as illustrated in FIG. 8, which is described in detail below. As described above, the item recommendations can be displayed along with an indication of what the remaining box capacity would be if the recommended items were added to the existing box(es).

The user would not pay any additional shipping fees to add these items recommended by the box completion recommender 162 in some cases because each of the recommended items could fit in the existing box(es) without requiring any additional boxes. Thus, the box completion recommender 162 allows the user to easily identify items that he or she may wish to add to the existing box(es) without incurring any additional shipping charges. The box completion recommender 162 can therefore allow the user to increase the box weight used to take better advantage of the weight-based shipping service.

Turning to FIG. 5, a bundle recommendation process 500 is shown. As discussed above, in addition to providing item recommendations that would fill up the existing boxes, the recommendation service 160 may also provide recommendations of one or more complete boxes. The bundle recommendation process 500 can recommend bundles of items (e.g., boxes full of pre-assembled, automatically assembled, or partially user-assembled items) that are assembled based on a particular theme, allowing the user to conveniently select a ready-made box for purchase and potentially enjoy a price discount.

At block 502, the bundle recommender 164 identifies a theme. For example, the theme may be selected from a variety of themes, vendors, seasonal or personal events, etc. For example, if the user is currently browsing cleaning supplies, the bundle recommender 164 may select cleaning supplies as the theme. The bundle recommender 164 may also select the theme based on the time of the year. For example, the selected theme may be back-to-school, Valentine's Day, Thanksgiving, the user's birthday, a birthday of a user's friend in a social networking context, etc. The theme may also be selected based on any user data that may be available in the user data repository 180. For example, the theme may be selected based on the data stored in the user's profile or preferences. In one embodiment, the theme may be selected based on common attributes or categories of the items in the existing boxes and/or previously searched, browsed, or purchased by the user. For example, if the user has previously purchased a box full of chocolate chip cookies, the selected theme may be "cookies," and a bundle may be recommended to the user according to the selected theme.

At block 504, the bundle recommender 164 identifies items associated with the theme. For example, if the identified theme is "cleaning supplies," the bundle recommender 164 may identify a variety of cleaning supplies. At block 506, the bundle recommender 164 selects from the identified items a subset of items that satisfy a shipping parameter or constraint. One example shipping parameter or constraint of the bundle is that the combined weight (or volume, or any other physical or logical metric) of the subset of items is to be less than or equal to the box capacity. Another shipping parameter or constraint may be that each of the items in the subset of items has to be eligible for weight-based shipping. In another embodiment, other shipping parameters or constraints not discussed herein may be applied. After the bundle recommender 164 selects the subset of items, at block 508, the bundle recommender 164 outputs the subset of items for presentation to the user. For example, the subset of items may be displayed to the user on the user device 102, while the user is browsing the electronic catalog or viewing the item detail page of a particular item.

In one embodiment, the bundle recommender 164 recommends a bundle including categories of items and allows the user to choose an item from each category to complete the box. For example, the bundle recommender 164 may recommend a healthy-eating bundle in which the user is given five options of quinoa, five options of olive oil, five options of almonds, etc. Thus, the user can select one type of quinoa, one type of olive oil, one type of almonds, etc. (e.g., one item from each category) to complete the box. In another example, the bundle recommender 164 may recommend a laundry bundle, in which the user may select one type of laundry detergent, one type of fabric sheet, one type of bleach, one type of stain remover, etc. The list of related items (e.g., different types of laundry detergent) may be provided to the user in a scrollable fashion, allowing the user to scroll through a group of items and select one or more items from the group. The items in the group may be sorted by the best prices and/or ratings.

In one embodiment, the bundle recommender 164 assembles bundles based on a particular vendor that the user may like. If the user has previously bought, searched, and/or viewed items sold by a particular vendor, the bundle recommender 164 may recommend a bundle including items sold by that particular vendor. For example, if the user has purchased cookies sold by Vendor X many times, the bundle recommender 164 may recommend a bundle filled with an assortment of cookies from Vendor X.

In another embodiment, the bundle recommender 164 allows the vendors to assemble their own bundles. The bundle recommender 164 may provide vendors, whose items are included in the electronic catalog, with a user interface for assembling bundles for easy purchase by the users of the interactive computing system 110. For example, a vendor of cleaning supplies may assemble, via the user interface provided by the bundle recommender 164, a bundle including a variety of cleaning supplies sold by the vendor, and the bundle recommender 164 may recommend the bundle to any user that may be interested in purchasing the bundle. Because the bundle includes multiple items sold by the vendor, the vendor may decide to sell the bundle at a lower price than if the items in the bundle were sold separately. Thus, both the vendor and the potential purchaser of the bundle may benefit.

In another embodiment, the bundle recommender 164 allows the user to select an option from a list of themes, vendors, or other categories, and the bundle recommender 164 generates one or more bundles based on the selected option. The bundle recommender 164 may provide to the user a list of boxes that the user has previously purchased. If any of the items in a previously-purchased box is no longer available, the bundle recommender 164 may provide the user with item recommendations that could replace the now-unavailable items.

Figure 7:
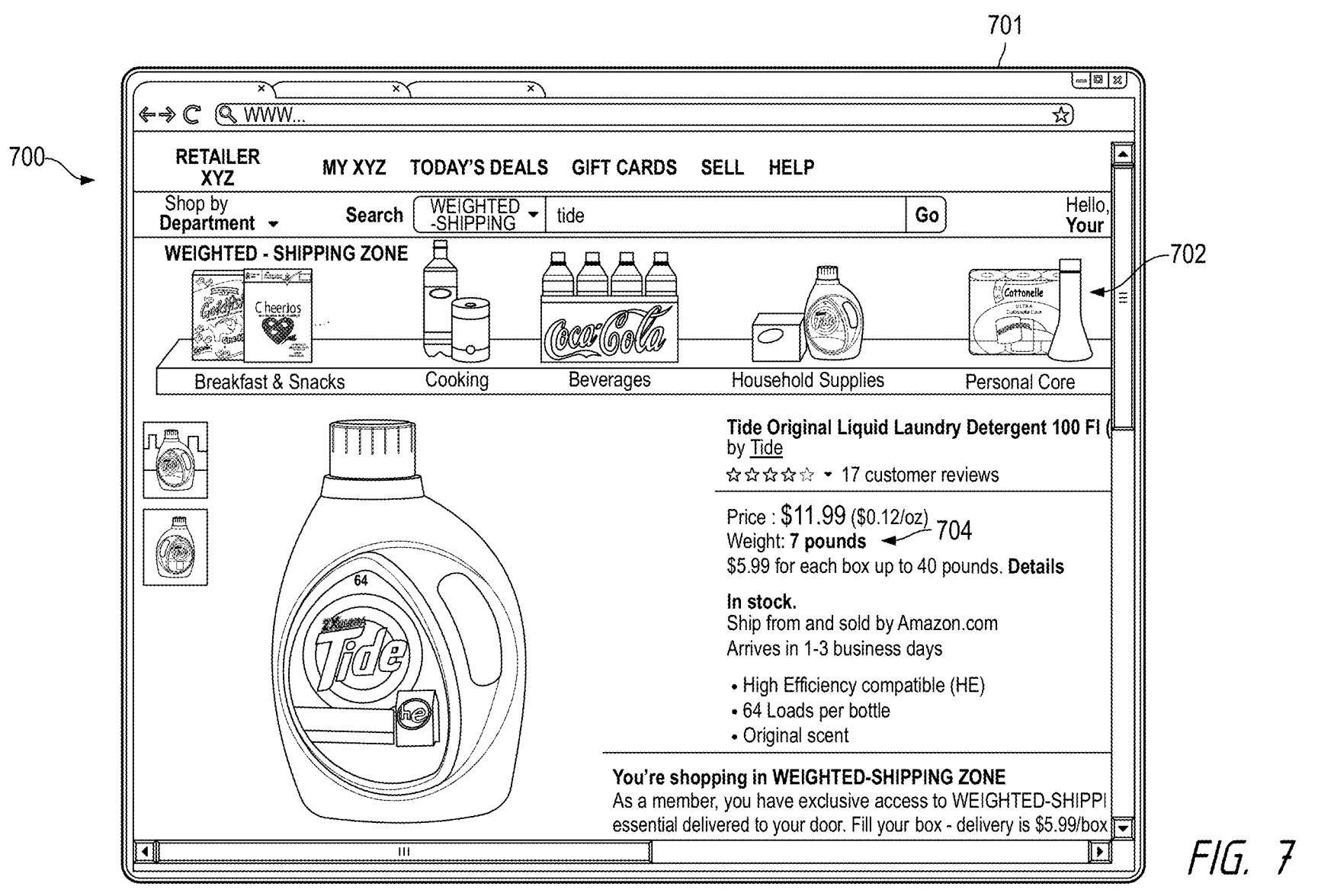

To enhance the shopping experience of the user, the recommendation service 160 may provide the user with a list of categories that may resemble the different aisles of a physical store. For example, such categories may include "breakfast," "snacks," "cooking," "beverages," etc., as illustrated in FIG. 7, which is further discussed below. Each category may expand into further sub-categories upon selection by the user. The recommendation service 160 may customize the list of categories based on the user's prior purchase, search, or browse history.

IV. Example Weight-Based Shipping User Interfaces

FIGS. 6 through 13 depict various user interfaces for providing a weight-based shipping service to users. Each of the user interfaces shown includes one or more user interface controls that can be selected by a user, for example, using a browser or other application software (including mobile application software). The user interface controls shown are merely illustrative examples and can be varied in other embodiments. For instance, buttons, dropdown boxes, select boxes, text boxes, check boxes, slider controls, and other user interface controls shown, may be substituted with other types of user interface controls that provide the same or similar functionality. Further, user interface controls may be combined or divided into other sets of user interface controls such that similar functionality or the same functionality may be provided with different looking user interfaces. Moreover, each of the user interface controls may be selected by a user using one or more input options, such as a mouse, touch screen input, or keyboard input, among other user interface input options.

Turning to FIG. 6A, an example user interface 600 that may be presented in a browser 601 (or other application) is shown. The browser 601 may be installed on a user device such as one of the user devices 102 of FIG. 1. This particular user interface 600 depicts a search results page that may be displayed to the user in response to the user submission of a search term (e.g., "tide"). The user interface 600 includes user interface controls 606 and 608 for searching for items. The user interface control 606 is an example search box into which a user can type text to search for an item name. A search button 608 can be selected by the user to initiate the search once the text is input into the text box 606. In the illustrated embodiment, the search results page displays a list of items that matches the search term. Shipping eligibility indicator 602 indicates that the first item in the list is eligible for free shipping. Shipping eligibility indicator 604 indicates that the second item in the list is eligible for weight-based shipping. If the user adds the second item to the shopping cart, based on its weight-based shipping eligibility, the second item will be placed in a weight-based shipping containers in accordance with the discussion above. Alternatively, if the user selects the second item for viewing, the item detail page of the second item (e.g., as illustrated in FIG. 7) may be displayed to the user. The user may then choose to add the item to the shopping cart for weight-based shipping.

FIG. 6B illustrates another example user interface 620 that may be presented in a browser 621 (or other application). The browser 621 may be installed on a user device such as one of the user devices 102. In the user interface 620, each weight-based shipping eligible item is displayed along with its box capacity. In the example of FIG. 6B, the second item in the list of search results is weight-based shipping eligible, and it fills 16% of the box. If the user places a cursor 622 next to the weight capacity of the item or otherwise selects the item, a message window 624 including additional information for the user is displayed to the user. As shown in FIG. 6B, the additional information may include an explanation of how the item capacity is calculated.

Turning to FIG. 7, an example user interface 700 that may be presented in a browser 701 (or other application) is shown. The browser 701 may be installed on a user device such as one of the user devices 102 of FIG. 1. This particular user interface 700 depicts an item detail page that may be displayed to the user in response to the user selection of an item from the electronic catalog (e.g., the search results page of FIG. 6A or 6B). The user interface 700 includes a shelf section 702 that displays a variety of categories of items. As shown in FIG. 7, the item detail page of weight-based shipping eligible items may display weight 704 of the item. As discussed above, volume, percentage, or any other physical or logical metric may be displayed instead of the weight 704.

Turning to FIG. 8, an example user interface 800 that may be presented in a browser 801 (or other application) is shown. The browser 801 may be installed on a user device such as one of the user devices 102. As discussed with reference to FIG. 2, as the user is adding items to his or her box, the box status may be provided to the user. This particular user interface 800 depicts a box status 802 and a set of item recommendations 804 displayed to the user. As illustrated in FIG. 8, the box status 802 indicates the total weight of the items in the weight-based shipping container, and the item recommendations 804 based on the current items in the weight-based shipping container are displayed to the user.

Turning to FIG. 9A, an example user interface 900 that may be presented in a browser 901 (or other application) is shown. The browser 901 may be installed on a user device such as one of the user devices 102. As discussed with reference to FIG. 2, as the user is adding items to his or her box, additional boxes may be added as the existing boxes are filled. In the example of FIG. 9A, the total weight of the items added exceeds the box capacity (e.g., 45 lbs), and new boxes have been added, as shown by the box status 902 in the user interface 900. The box status 902 may indicate e.g., current weight, remaining weight, number of items, number of boxes, etc.

FIG. 9B illustrates another example user interface 920 that may be presented in a browser 921 (or other application). The browser 921 may be installed on a user device such as one of the user devices 102. In the example user interface 920, a box status 922 displayed to the user indicates how full the current box is. In one embodiment, the box status 922 indicates the percentage of the box capacity filled so far (e.g., 6% full), instead of indicating the total weight of the items as shown in FIG. 9A. In another embodiment, the box status 922 indicates the percentage of the box capacity remaining (e.g., 94% remaining). It may also display one or more full boxes, marking them as full as shown in FIG. 9B.

Turning to FIG. 10, an example user interface 1000 that may be presented in a browser 1001 (or other application) is shown. The browser 1001 may be installed on a user device such as one of the user devices 102. This particular user interface 1000 depicts a search results page displayed to the user. As illustrated in FIG. 10, the weights 1002 of the items are also displayed to the user. As discussed above, instead of the weights 1002, item volume, item percentage, or any other physical or logical metric may be displayed.

Turning to FIGS. 11A through 11C, example user interfaces 1100, 1110, and 1120 implemented in a user device 102, such as a smartphone or tablet, are shown. The example user interfaces 1100, 1110, and 1120 illustrate the process of adding items to the weight-based shipping containers (e.g., boxes). As shown in FIGS. 11A through 11C, as items are added to the box(es), the box statuses 1102, 1112, and 1122 are updated to reflect the added weight. As existing boxes are filled up, new boxes are added. As discussed above, new boxes may be added automatically or upon user approval/acknowledgement.

Turning to FIG. 12, an example user interface 1200 that may be presented in a browser 1201 (or other application) is shown. The browser 1201 may be installed on a user device such as one of the user devices 102. After the user has finished adding items, the user may choose to display his or her shopping cart before paying for the items. This particular user interface 1200 depicts an example shopping cart page displayed to the user. As illustrated in FIG. 12, weight-based shipping eligible items are grouped together and displayed under the weight-based shipping eligible section 1202 of the shopping cart.

Figure 13:
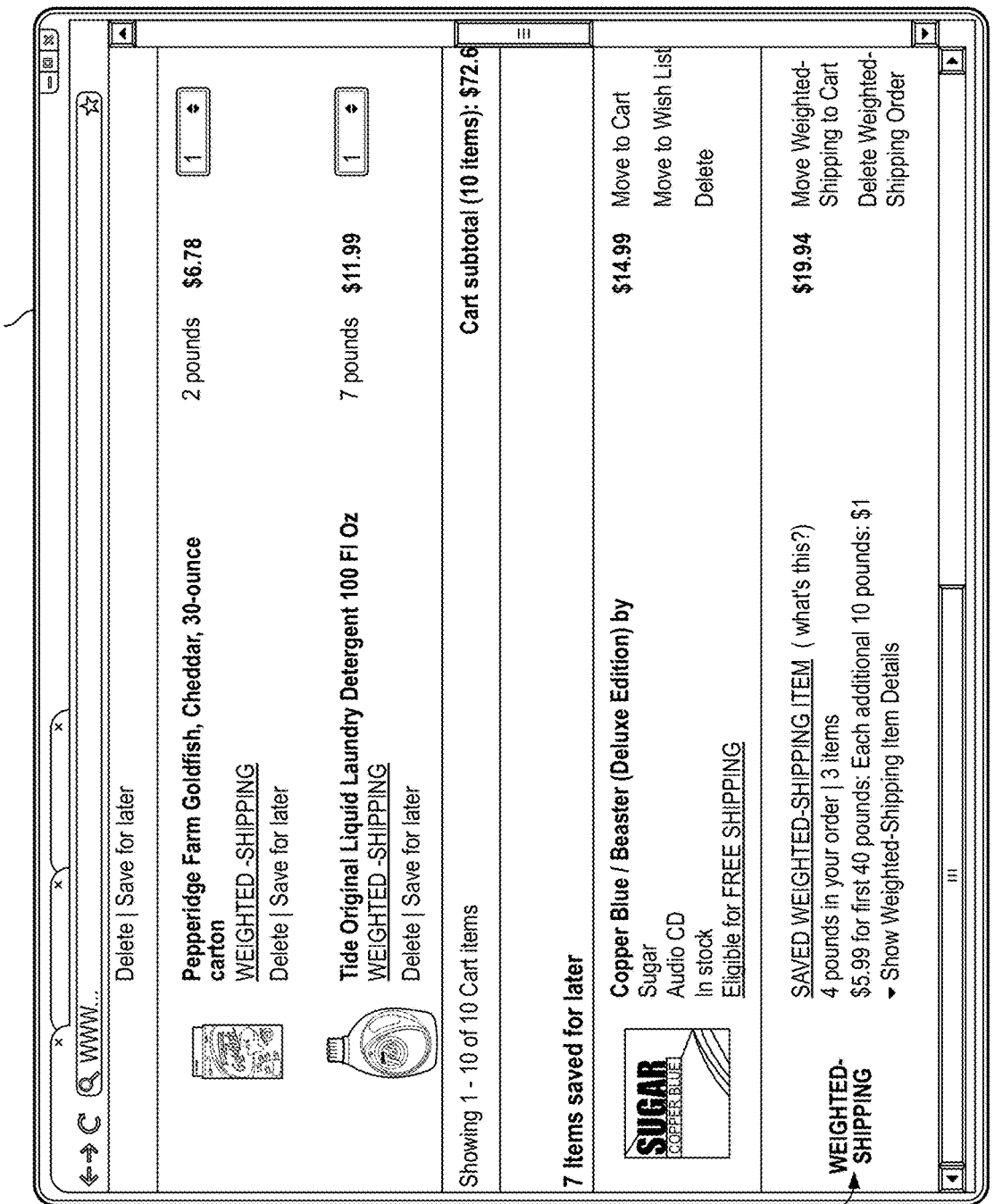
FIG. 13 depicts an example graphical user interface that provides a list of items saved for future purchase.

Turning to FIG. 13, an example user interface 1300 that may be presented in a browser 1301 (or other application) is shown. The browser 1301 may be installed on a user device such as one of the user devices 102. This particular user interface 1300 depicts a shopping cart page displayed to the user. As illustrated in FIG. 13, at the bottom of the shopping cart page, items that are added to the shopping cart but saved for later checkout are displayed. As illustrated in FIG. 13, among the items saved for later, the weight-based shipping eligible items can be grouped together and displayed under the weight-based shipping eligible section 1302 of the page.

V. Additional Embodiments

As discussed above, in some embodiments, there may be multiple available weight-based shipping containers having varying capacities and fees. For example, a 10-lb box may cost $2.99 to ship, a 25-lb box may cost $3.99 to ship, and a 45-lb box may cost $5.99 to ship. The capacity and fee for the shipping containers are not limited to those discussed herein, and may be set to any arbitrary value.

In some embodiments, the box capacity is based on the number of items. For example, the box capacity may limit the number of items that may fit in a single box to 10 items. The items in the electronic catalog may be categorized based on their weight and volume, and the limit may differ based on the category of the items. For example, a box may be limited to only one item that is categorized as relatively heavy or large. Thus, box capacity may be determined based on qualitative classifications of item size or weight in addition to, or instead of, other quantitative measures described herein.

In some embodiments, each item may have shipping fee associated with the item. For example, some items may cost money to add to the box, and other items may be free to add to the box. The shipping fee for shipping a particular box may be calculated based on the sum of the shipping fees of all the items in the particular box.

VI. Example Embodiments (EE)

As discussed above, in some embodiments, there may be multiple available weight-based shipping containers having varying capacities and fees. For example, a 10-lb box may cost $2.99 to ship, a 25-lb box may cost $3.99 to ship, and a 45-lb box may cost $5.99 to ship. The capacity and fee for the shipping containers are not limited to those discussed herein, and may be set to any arbitrary value.

EE 1: A computer-implemented method comprising: under control of a hardware processor implementing specific computer-executable instructions, providing a first user interface to a user, the first user interface comprising: a virtual shipping container that represents a physical shipping container associated with a flat shipping fee, and an indication of a current available capacity of the physical shipping container; receiving a selection from the user of a product from an electronic catalog, the product eligible for shipment to the user in the physical shipping container at the associated flat shipping fee, and the product associated with a shipping parameter; determining that the shipping parameter of the product meets the current available capacity of the physical shipping container; calculating an updated available capacity of the physical shipping container responsive to said determining based at least in part on the shipping parameter of the product and the current available capacity of the physical shipping container; and providing a second user interface to the user, the second user interface including the updated available capacity of the physical shipping container.

EE 2: The computer-implemented method of EE 1, further comprising generating a recommendation of another product eligible for shipment to the user in the physical shipping container, the another product associated with a respective shipping parameter that meets the updated available capacity of the physical shipping container.

EE 3: The computer-implemented method of EE 1, further comprising generating a recommendation of a bundle of other products eligible for shipment to the user in the physical container, the bundle of other products associated with a bundle shipping parameter that meets the updated available capacity of the physical shipping container.

EE 4: The computer-implemented method of EE 1, wherein the shipping parameter associated with the product comprises at least one of an actual weight of the product, a dimensional weight of the product, or a volume of the product.

EE 5: A system comprising: an electronic data store configured to at least store item data associated with each item of a plurality of items of an electronic catalog; and a computing system comprising one or more hardware computing devices, the computing system in communication with the electronic data store and configured to at least: provide a user interface to a user, the user interface comprising: a virtual shipping container that represents a physical shipping container, and an indication of an available capacity of the physical shipping container; receive a selection from the user of an item from the electronic catalog, the item associated with a shipping parameter; determine that the shipping parameter of the item meets the available capacity of the physical shipping container; in response to a determination that the shipping parameter meets the available capacity, calculate a remaining available capacity of the physical shipping container based at least in part on the shipping parameter of the item and the available capacity of the physical shipping container; and provide an indication to the user of the remaining available capacity of the physical shipping container.

EE 6: The system of EE 5, wherein the physical shipping container has a flat shipping fee associated therewith.

EE 7: The system of EE 5, wherein the shipping parameter of the item comprises at least one of an actual weight, an item weight, a packaging weight, a dimensional weight, dimensions, an actual volume, a price, and an item type.

EE 8: The system of EE 5, wherein the computing system is further configured to generate a recommendation of one or more additional items based at least in part on the remaining available capacity of the physical shipping container.

EE 9: The system of EE 8, wherein the computing system is further configured to generate the recommendation of the one or more additional items based at least in part on the selection of the item received from the user.

EE 10: The system of EE 8, wherein the electronic data store is further configured to store user account data associated with each user of a plurality of users of the system, and wherein the computing system is further configured to generate the recommendation of the one or more additional items based at least in part on the user account data of the user.

EE 11: The system of EE 5, wherein the computing system is further configured to generate a recommendation of a new virtual shipping container associated with a bundle of items selected from the items in the electronic catalog.

EE 12: The system of EE 5, wherein the computing system is further configured to calculate the remaining available capacity based at least in part on at least one of an actual weight of the item or a dimensional weight of the item.

EE 13: The system of EE 5, wherein the computing system is further configured to provide an indication of that the item is eligible for shipment to the user in the physical shipping container corresponding to the virtual shipping container at a flat shipping fee.

EE 14: The system of EE 5, wherein the computing system is further configured to provide additional information comprising at least one of information regarding a shipping policy, information regarding the shipping parameter of the item, or information regarding a current or updated available capacity of the physical shipping container.

EE 15: The system of EE 5, wherein the electronic data store is further configured to store user account data associated with each user of a plurality of users of the system, and wherein the computing system is further configured to determine, based at least in part on the user account data associated with the user, that the user is eligible for having the item shipped in the physical shipping container corresponding to the virtual shipping container at a flat shipping fee.

EE 16: The system of EE 5, wherein the electronic data store is further configured to associate the item with a second physical shipping container in response to a determination that the shipping parameter does not meet the available capacity of the physical shipping container.

EE 17: Non-transitory physical computer storage comprising computer-executable instructions stored thereon that, when executed by a hardware processor, are configured to perform operations comprising: providing a graphical representation of a flat rate physical shipping container, together with an indication of an available capacity of the flat rate physical shipping container; receiving a selection from the user of an item from an electronic catalog, the item having a shipping size; upon receiving the selection of the item, determining that the shipping size of the item meets the available capacity of the flat rate physical shipping container; and outputting to the user an indication that the shipping size of the item meets the available capacity of the flat rate physical shipping container.

EE 18: The non-transitory physical computer storage of EE 17, wherein said accessing the shipping size comprises accessing a dimensional weight of the item.

EE 19: The non-transitory physical computer storage of EE 17, wherein the operations further comprise outputting one or more recommended items for presentation to the user, wherein shipping sizes of the one or more recommended items collectively meet the available capacity of the flat rate physical shipping container.

EE 20: The non-transitory physical computer storage of EE 17, wherein the item comprises a bundle of items; and the shipping size comprises a collective shipping size of the bundle of items.

EE 21: The non-transitory physical computer storage of EE 17, wherein the operations further comprise: in response to determining that the shipping size of the item does not meet the available capacity of the flat rate physical shipping container, providing a second graphical representation of a second flat rate physical shipping container in which the item can be shipped.

EE 22: The non-transitory physical computer storage of EE 17, wherein the selection of the item received from the user comprises a selection of the item from a list of one or more items from the electronic catalog, wherein the list of one or more items from the electronic catalog was generated in response to a search request from the user, and wherein the operations further comprise upon receiving the selection of the item, associating the item with an electronic shopping cart for the user.

VII. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others.

What is claimed is:

1. A computer-implemented method comprising:
   under control of a hardware processor implementing specific computer-executable instructions,
   causing, at least in part by a box allocation module, presentation of a first graphical user interface, wherein the first graphical user interface includes:
      a first indication of a progress towards reaching a parameter value associated with a virtual shipping container,
      a first group of products from an electronic catalog, and
      for individual products in the first group of products, a parameter associated with the individual product, the parameter indicating how much the individual product, following addition to the virtual shipping container, will contribute to the progress towards reaching the parameter value associated with the virtual shipping container;
   receiving, at least in part by the box allocation module, a selection of a first product from the first group of products included in the first graphical user interface to add to the virtual shipping container, wherein the first graphical user interface includes a first parameter indicating how much the first product will contribute to the progress towards reaching the parameter value associated with the virtual shipping container;
   adding, at least in part by the box allocation module, the first product from the first group of products to the virtual shipping container;
   determining, based at least in part on the first parameter and at least in part by the box allocation module, an updated progress towards reaching the parameter value associated with the virtual shipping container; and
   causing, at least in part by the box allocation module, presentation of a second graphical user interface, wherein the second graphical user interface includes a second indication of the updated progress towards reaching the parameter value associated with the virtual shipping container, wherein a difference between the first indication included in the first graphical user interface and the second indication included in the second graphical user interface is proportional to the first parameter included in the first graphical user interface.

2. The computer-implemented method of claim 1, further comprising causing presentation, in response to the selection of the first product, of a recommendation for an additional product from the electronic catalog.

3. The computer-implemented method of claim 1, wherein the parameter value associated with the virtual shipping container is a price value.

4. The computer-implemented method of claim 1, wherein each product in the first group of products is eligible to be added to the virtual shipping container, and wherein at least one product in the electronic catalog is not eligible to be added to the virtual shipping container.

5. The computer-implemented method of claim 1, wherein the first parameter causes the parameter value associated with the virtual shipping container to be exceeded.

6. The computer-implemented method of claim 5, further comprising applying a shipping rate adjustment based at least in part on the parameter value associated with the virtual shipping container being exceeded.

7. The computer-implemented method of claim 1, wherein the second graphical user interface further includes a graphical user interface element, and wherein the computer-implemented method further comprises causing, in response to activation of the graphical user interface element, presentation of additional information regarding the virtual shipping container and the parameter value associated with the virtual shipping container.

8. A system comprising:
   one or more processors; and
   one or more memories having stored thereon instructions, which, when executed by the one or more processors, cause the one or more processors to at least:
   cause, at least in part by using a box allocation module, presentation of a first graphical user interface, wherein the first graphical user interface includes:
      a first indication of a progress towards reaching a parameter value associated with a virtual shipping container,
      a first group of products from an electronic catalog, and
      for individual products in the first group of products, a parameter associated with the individual product, the parameter indicating how much the individual product, following addition to the virtual shipping container, will contribute to the progress towards reaching the parameter value associated with the virtual shipping container;

receive, at least in part by using the box allocation module, a selection of a first product from the first group of products included in the first graphical user interface to add to the virtual shipping container, wherein the first graphical user interface includes a first parameter indicating how much the first product will contribute to the progress towards reaching the parameter value associated with the virtual shipping container;

add, at least in part by using the box allocation module, the first product from the first group of products to the virtual shipping container;

determine, based at least in part on the first parameter and at least in part by using the box allocation module, an updated progress towards reaching the parameter value associated with the virtual shipping container; and cause, at least in part by using the box allocation module, presentation of a second graphical user interface, wherein the second graphical user interface includes a second indication of the updated progress towards reaching the parameter value associated with the virtual shipping container, wherein a difference between the first indication included in the first graphical user interface and the second indication included in the second graphical user interface is proportional to the first parameter included in the first graphical user interface.

9. The system of claim 8, wherein the instructions, when executed, further cause the one or more processors to at least cause presentation of a recommendation for an additional product from the electronic catalog in response to the selection of the first product.

10. The system of claim 8, wherein the parameter value associated with the virtual shipping container is a price value.

11. The system of claim 8, wherein each product in the first group of products is eligible to be added to the virtual shipping container, and wherein at least one product in the electronic catalog is not eligible to be added to the virtual shipping container.

12. The system of claim 8, wherein the first parameter causes the parameter value associated with the virtual shipping container to be exceeded.

13. The system of claim 12, wherein the instructions, when executed, further cause the one or more processors to at least apply a shipping rate adjustment based at least in part on the parameter value associated with the virtual shipping container being exceeded.

14. The system of claim 8, wherein the second graphical user interface further includes a graphical user interface element, and wherein the instructions, when executed, further cause the one or more processors to at least cause presentation of additional information regarding the virtual shipping container and the parameter value associated with the virtual shipping container in response to activation of the graphical user interface element.

15. Non-transitory physical computer storage comprising computer-executable instructions that, when executed by one or more computing devices, configure the one or more computing devices to at least:

cause, at least in part by using a box allocation module, presentation of a first graphical user interface, wherein the first graphical user interface includes:

a first indication of a progress towards reaching a parameter value associated with a virtual shipping container, a first group of products from an electronic catalog, and for individual products in the first group of products, a parameter associated with the individual product, the parameter indicating how much the individual product, following addition to the virtual shipping container, will contribute to the progress towards reaching the parameter value associated with the virtual shipping container;

receive, at least in part by using the box allocation module, a selection of a first product from the first group of products included in the first graphical user interface to add to the virtual shipping container, wherein the first graphical user interface includes a first parameter indicating how much the first product will contribute to the progress towards reaching the parameter value associated with the virtual shipping container;

add, at least in part by using the box allocation module, the first product from the first group of products to the virtual shipping container;

determine, based at least in part on the first parameter and at least in part by using the box allocation module, an updated progress towards reaching the parameter value associated with the virtual shipping container; and cause, at least in part by using the box allocation module, presentation of a second graphical user interface, wherein the second graphical user interface includes a second indication of the updated progress towards reaching the parameter value associated with the virtual shipping container, wherein a difference between the first indication included in the first graphical user interface and the second indication included in the second graphical user interface is proportional to the first parameter included in the first graphical user interface.

16. The non-transitory physical computer storage of claim 15, wherein the computer-executable instructions further configure the one or more computing devices to at least cause presentation of a recommendation for an additional product from the electronic catalog in response to the selection of the first product.

17. The non-transitory physical computer storage of claim 15, wherein the parameter value associated with the virtual shipping container is a price value.

18. The non-transitory physical computer storage of claim 15, wherein each product in the first group of products is eligible to be added to the virtual shipping container, and wherein at least one product in the electronic catalog is not eligible to be added to the virtual shipping container.

19. The non-transitory physical computer storage of claim 15, wherein the first parameter causes the parameter value associated with the virtual shipping container to be exceeded.

20. The non-transitory physical computer storage of claim 15, wherein the computer-executable instructions further configure the one or more computing devices to at least cause presentation of additional information regarding the virtual shipping container and the parameter value associated with the virtual shipping container in response to activation of a graphical user interface element in the second graphical user interface.

* * * * *